US012694769B2

(12) United States Patent
Brakob et al.

(10) Patent No.: US 12,694,769 B2
(45) Date of Patent: Jul. 28, 2026

(54) GENERATING WATCH LISTS FOR RETAIL STORES BASED ON UNSTRUCTURED DATA AND SYSTEM-BASED INFERENCES

(71) Applicant: Target Brands, Inc., Minneapolis, MN (US)

(72) Inventors: Christopher Brakob, Minneapolis, MN (US); Ethan Sommer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 230 days.

(21) Appl. No.: 18/798,991

(22) Filed: Aug. 9, 2024

(65) Prior Publication Data

US 2024/0404379 A1     Dec. 5, 2024

Related U.S. Application Data

(63) Continuation of application No. 17/722,905, filed on Apr. 18, 2022, now Pat. No. 12,100,274.

(Continued)

(51) Int. Cl.
*G08B 13/196* (2006.01)
*G06V 40/10* (2022.01)

(52) U.S. Cl.
CPC ....... *G08B 13/19608* (2013.01); *G06V 40/10* (2022.01); *G08B 13/19613* (2013.01); *G08B 13/19682* (2013.01)

(58) Field of Classification Search
CPC .......... G01S 7/417; G06V 20/00; G06N 5/04; G06N 3/0455; G06N 3/0464; G06N 3/08;

(Continued)

(56) References Cited

U.S. PATENT DOCUMENTS

| | | | |
|---|---|---|---|
| 8,831,972 B2 * | 9/2014 | Angell | G06Q 30/02 |
| | | | 705/14.26 |
| 9,311,645 B2 * | 4/2016 | Edwards | G06Q 30/018 |

(Continued)

FOREIGN PATENT DOCUMENTS

| | | | | |
|---|---|---|---|---|
| EP | 3709275 A1 * | 9/2020 | ....... | G08B 13/19654 |
| WO | WO-2020043262 A1 * | 3/2020 | ........... | G08B 29/186 |
| WO | WO-2021025958 A1 * | 2/2021 | ......... | G06V 30/2276 |

OTHER PUBLICATIONS

Arora, Jatin, "Theft Detection Using Machine Learning", Medium, Sep. 24, 2020, 20 pages.

*Primary Examiner* — Dung Hong
(74) *Attorney, Agent, or Firm* — Barnes & Thornburg LLP

(57) ABSTRACT

Described herein are systems and methods for generating a watch list of users who pose specific security threats to a store. The method can include retrieving, by a computer system from a data store, case files that document activity that poses a security threat by a user at the store, predicting, based on applying prediction models to the case files, future activity associated with the case files, determining threat scores for the case files based on the predicted future activity, ranking the case files into a candidate list from highest to lowest threat score, generating a watch list for the store that includes a subset of the ranked case files based on which case files pose a greatest current threat to the store, generating summary videos for each case file in the watch list, and transmitting the watch list and summary videos to a user device.

20 Claims, 13 Drawing Sheets

Related U.S. Application Data

(60) Provisional application No. 63/303,330, filed on Jan. 26, 2022, provisional application No. 63/217,988, filed on Jul. 2, 2021.

(58) Field of Classification Search
CPC ..... G06F 11/3051; G06F 16/35; G06V 20/52; G06V 40/00; G06V 20/40; G06V 40/20; G06V 20/41; G06V 40/10; G08B 13/19608; G08B 13/19613; G08B 13/19682
See application file for complete search history.

(56) References Cited

U.S. PATENT DOCUMENTS

| | | | | |
|---|---|---|---|---|
| 9,786,113 | B2 * | 10/2017 | Carey | G07F 9/026 |
| 11,700,272 | B2 * | 7/2023 | Dalal | H04L 63/1425 |
| 11,842,513 | B2 * | 12/2023 | Kawano | G06T 7/74 |
| 2008/0249793 | A1 * | 10/2008 | Angell | G06Q 30/02 |
| | | | | 705/1.1 |
| 2018/0158063 | A1 * | 6/2018 | Jamtgaard | G06Q 10/06398 |
| 2019/0182436 | A1 * | 6/2019 | Gupta | H04N 5/272 |
| 2020/0043320 | A1 * | 2/2020 | Carey | G08B 13/248 |
| 2021/0042509 | A1 * | 2/2021 | Valiulla | G06N 20/00 |
| 2021/0065189 | A1 * | 3/2021 | Laserson | G06Q 20/208 |
| 2021/0390735 | A1 * | 12/2021 | Kawano | G06V 40/172 |
| 2022/0392335 | A1 * | 12/2022 | Carey | G08B 13/2454 |

* cited by examiner

500

Retrieve candidate list of ranked case files for a store
502

Retrieve culling model(s)
504

Apply culling model(s)
506

Generate watch list
508

Random forest ranking
510

Generate summary videos for each case file on watch list
512

Transmit watch list and summary videos to in-store employee device
514

800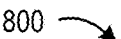

```
┌─────────────────────────────────────────────────────────┐
│     Retrieve candidate list of ranked case files for a store │
│                          802                              │
└─────────────────────────────────────────────────────────┘
                            │
                            ▼
┌─────────────────────────────────────────────────────────┐
Yes │  Quantity of case files in candidate list > threshold quantity? │ No
    │                        804                            │
└─────────────────────────────────────────────────────────┘
                            │
                            ▼
┌─────────────────────────────────────────────────────────┐
│ Divide case files into groups in a watch list based on quantity of case files and │
│                  quantity of in-store employees           │
│                          806                              │
└─────────────────────────────────────────────────────────┘
                            │
                            ▼
┌─────────────────────────────────────────────────────────┐
│  Assign each of the groups of case files in the watch list to │
│                  In-store employees                       │
│                          808                              │
└─────────────────────────────────────────────────────────┘
                            │
                            ▼
┌─────────────────────────────────────────────────────────┐
│         Generate summary videos for each case file        │
│                          810                              │
└─────────────────────────────────────────────────────────┘
                            │
                            ▼
┌─────────────────────────────────────────────────────────┐
│  Transmit watch list, summary videos, and/or assignments  │
│        for each group to in-store employee devices        │
│                          812                              │
└─────────────────────────────────────────────────────────┘
```

FIG. 8

GENERATING WATCH LISTS FOR RETAIL STORES BASED ON UNSTRUCTURED DATA AND SYSTEM-BASED INFERENCES

CROSS-REFERENCE TO RELATED APPLICATIONS

This application is a continuation of U.S. application Ser. No. 17/722,905, filed Apr. 18, 2022, which claims the benefit of U.S. Application Ser. No. 63/303,330, filed Jan. 26, 2022 and U.S. Application Ser. No. 63/217,988, filed Jul. 2, 2021. The disclosures of the prior applications are considered part of the disclosure of this application, and are incorporated in their entireties into this application.

TECHNICAL FIELD

This document generally describes devices, systems, and methods related to generating culled watch lists that retail stores can use to mitigate potential security threats.

BACKGROUND

Retailer environments, such as grocery stores, receive many different types of customers. Some customers can enter a store with the intention of purchasing items. Typically, guests enter a store, collect items they wish to purchase, and then proceed to a checkout lane to purchase the items they have collected. Occasionally guests may intentionally or unintentionally leave a store without paying for some items, though. For example, some guests may forget about items that are located underneath other items, such as items located in the bottom of a shopping cart, and may leave the store without processing those items as part of a checkout procedure. In other instances, guests may intentionally leave a store without paying for items, and may take measures to hide their activity, such as concealing items inside of a bag or clothing, or potentially swapping barcodes with other items of lower value so that that the guest goes through the checkout process, but pays for the lower value item identified by the barcode even though they are leaving with the higher value physical item. Leaving a store without paying for the full value of the item may be considered shoplifting or stealing, and may be considered a shortage with regard to inventory levels in stores.

Stores may be equipped with various technology that is capable of providing information on shoppers who leave a store with stolen items. For example, stores may have a camera security system installed that can capture video and/or images of guests who are in stores. A person, such as a security officer, may actively and continuously monitor the camera security system in an attempt to identify potential shortages and/or other security events. As mentioned above, shoplifters can hide their activities so as to avoid detection, which can frustrate efforts of security officers to stop or otherwise prevent such activity.

SUMMARY

The document generally describes devices, systems, and methods for generating readily digestible and useful watch lists of guests who pose specific security threats to specific retail environments, such as a store, based on objective observations and determinations based on prior guest activity within retail stores. For example, the disclosed technology can provide for building case files of guests who pose specific security threats, scoring the guests based on their activity, ranking the guests based on their scores, and providing the digestible watch list of ranked guests who pose specific security threats to in-store employees. The watch lists can be used by in-store employees whose jobs are directed to safety and security operations in the retail environment. The watch lists can include a list of the guests who pose the most significant and likely security threat for that particular retail environment, such as guests who have a history of stealing items, getting into physical altercations, and/or other security-related threats within a retail environment. The watch lists can be generating based on a combination of data from different devices and systems.

Since the watch list can be culled to a set of the guests who pose the most significant security threat, the in-store employees can more easily digest or remember the customers on the watch list, thereby making their efforts to identify those guests and to mitigate potential future security events involving those guests more effective. For example, the watch list can include a top 10 guests who pose specific security threats rather than a list of all guests who pose specific security threats. Therefore, the in-store employees can more easily monitor customers in the retail environment and identify the customers that are included in the watch list.

In some implementations, the in-store employees can receive an updated watch list every day. The in-store employees can use the updated watch list to monitor customers in the store for that day. The watch list can be dynamically updated based on data and system-based inferences. For example, case files can be generated for each guest who poses a specific security threat that indicate the specific previous activity that guest performed that was deemed to be a security threat (e.g., theft, assault, battery).

A threat score can be assigned to each case file. The threat score can be determined based on a number of factors and data from different devices and systems. For example, the scores can be based on a quantity and/or value of items taken, types of items that are taken, acceleration and/or deceleration of theft, etc. The data can be received from devices such as cameras, POS terminals, etc. The threat score can also be determined based on system-based inferences. For example, a computing system can predict that a particular customer may continue to steal items during a predetermined time period. Accordingly, the threat score can be higher for this guest relative to other guests.

The threat scores can be dynamically updated based on continuous monitoring of the customer. For example, if a particular customer stole items once and did not steal items again over a predetermined period of time, the particular customer's threat score can be reduced. As another example, if a customer continuously steals items over the predetermined period of time, then that customer's threat score can be increased since they present a bigger threat to the retail environment. Customers with higher threat scores, or threat scores within a predetermined threshold range, can be added to the digestible watch list and ranked based on threat score. Accordingly, the in-store employees can focus on monitoring the customers with the highest threat scores in order to prevent such customers from engaging in more activity in the retail environment that poses potential security threats (i.e., theft, assault, battery).

As mentioned above, a watch list can be generated for each retail environment. The watch lists can be annotated with summary videos. The summary videos can include data or other information about the guests who pose specific security threats that can be used by the in-store employees to objectively identify, monitor, and/or intervene with the guests. For example, the summary video can include an image of the guests, their movements, their past actions, and objective identifiers such as credit card numbers. The summary videos can therefore help the in-store employees to better monitor and identify the guests who pose specific security threats if they return to the retail environment.

Thus, the disclosed technology can be used proactively to objectively identify guests who pose specific security threats before a security event occurs. Security events can include shoplifting, sweet hearting, other forms of theft, assault, battery, and other security-related disturbances. The disclosed technology can correlate data from a variety of different systems and devices located throughout stores to provide greater analysis and insights regarding security events.

Particular embodiments described herein include a method for generating a watch list of users who pose specific security threats to a store, the method including: retrieving, by a computer system and from a data store, case files associated with a store, each of the case files documenting activity that poses a security threat by a user at the store, predicting, by the computer system and based on applying one or more prediction models to each of the case files, future activity associated with the case file, the prediction models having been trained, using machine learning, to predict future activity based at least in part on a type of activity that poses a security threat documented in the case file, a quantity of stolen items associated with the case file, theft velocity, and a cost of stolen items associated with the case file, determining, by the computer system, a threat score for each of the case files based at least in part on the predicted future activity associated with the case file, ranking, by the computer system, the case files associated with the store into a candidate list from highest threat score to lowest threat score, generating, by the computer system and based on applying one or more culling models to the ranked candidate list, a watch list for the store that includes a subset of the case files in the ranked candidate list, the culling models having been trained, using machine learning, to identify the subset of the case files posing a greatest current threat to the store, the greatest current threat to the store corresponding to a threshold time period, generating, by the computer system, summary videos for each of the subset of the case files in the watch list, and transmitting, by the computer system to a user device, the watch list and the summary videos for presentation in a graphical user interface (GUI) display at the user device.

In some implementations, the method can optionally include one or more of the following features. For example, the method may also include receiving, by the computer system and from one or more devices in the store, at least one of recent unstructured data and device-based inferences associated with one or more of the case files, adjusting, by the computer system, the threat scores of the one or more case files based on the at least one of recent unstructured data and device-based inferences, and adjusting, by the computer system, the rankings of the case files in the candidate list based on the adjusted threat scores of the one or more case files. The one or more devices in the store can include at least one of a camera, location-based signaling device, RFID reader, and point of sale (POS) terminal. The recent unstructured data can include at least one of a video feed of a user associated with a case file engaging in activity that poses a security threat in the store, location-based coordinates of the user associated with the case file moving throughout the store, location-based coordinates of a shopping cart used by the user while at the store, and a transaction receipt. The device-based inferences can include a presumption, based on the recent unstructured data, that the user associated with the case file recently engaged in new activity that poses a security threat within another threshold time period.

In some implementations, adjusting, by the computer system, the threat scores of the one or more case files based on the at least one of recent unstructured data and device-based inferences can include: increasing the threat scores based on the at least one of recent unstructured data and device-based inferences having a threat level indication above a predetermined threshold and decreasing the threat scores based on the at least one of recent unstructured data and device-based inferences having a threat level indication below the predetermined threshold.

As another example, determining, by the computer system, a threat score for each of the case files can include: assigning a threat score above a threshold score value based on determining that the predicted future activity associated with the case file exceeds a threshold suspicion level and assigning a threat score below the threshold score value based on determining that the predicted future activity associated with the case file is less than the threshold suspicion level. In some implementations, determining, by the computer system, a threat score for each of the case files can include: assigning a threat score above a threshold score value based on determining that activity that poses a security threat documented in the case file occurred at stores within a threshold distance from the store and assigning a threat score below the threshold score value based on determining that the activity that poses a security threat documented in the case file occurred at stores outside of the threshold distance from the store.

In some implementations, determining, by the computer system, a threat score for each of the case files can include: assigning a threat score above a threshold score value based on determining that the user associated with the case file has not been apprehended and assigning a threat score below the threshold score value based on determining that the user associated with the case file has been apprehended. Sometimes, determining, by the computer system, a threat score for each of the case files can include: assigning a threat score below a threshold score value based on determining that activity that poses a security threat in the case file involves theft of one or more of a first predetermined category of items and assigning a threat score above the threshold score value based on determining that activity that poses a security threat in the case file involves theft of one or more of a second predetermined category of items. The first predetermined category of items can include at least one of necessity items and items costing less than a threshold cost value, the necessity items including at least one of produce, toothpaste, tooth brushes, and first aid supplies. The second predetermined category of items can include at least one of non-necessity items and items costing more than the threshold cost value, the non-necessity items including at least one of TVs, computers, and clothing.

As another example, determining, by the computer system, a threat score for each of the case files can include: assigning a threat score above a threshold score value based on determining that a quantity of stolen items associated with the case file exceeds a threshold quantity value and assigning a threat score below the threshold score value based on determining that the quantity of stolen items associated with the case file is less than the threshold quantity value. Sometimes, determining, by the computer system, a threat score for each of the case files can include: assigning a threat score above a threshold score value based on determining that activity that poses a security threat documented in the case file increased over a predetermined timeframe and assigning a threat score below the threshold score value based on determining that activity that poses a security threat documented in the case file decreased over the predetermined timeframe. Moreover, determining, by the computer system, a threat score for each of the case files can also include: assigning a threat score above a threshold score value based on determining that a theft frequency associated with the case file is within a predetermined frequency range and assigning a threat score below the threshold score value based on determining that theft frequency associated with the case file is outside of the predetermined frequency range.

As yet another example, generating, by the computer system and based on applying one or more culling models to the ranked candidate list, a watch list further can include: classifying the case files in the candidate list into one or more groups using random forest ranking, the one or more groups being based at least in part on threat score, severity of activity that poses a security threat documented in the case files, quantities of items stolen in the case files, costs of items stolen in the case files, and predicted future activity associated with the case files, and populating the watch list with case files from a subset of the groups, the subset of the groups including case files that pose a greatest current threat to the store. Sometimes, the summary videos can include, for each of the subset of the case files, at least one of data and device-based inferences associated with the case file that objectively identify the user associated with the case file. The summary videos for each of the subset of the case files can also be a compilation of at least one of an image of the user's appearance, a video of the user's gait, a video of the user's body movement, a license plate number associated with the user's vehicle, and a credit card number used by the user during one or more transactions in the store.

One or more embodiments described herein can include a system for generating a watch list of users who pose specific security threats to a store, the system including: one or more devices that may include cameras, RFID readers, location-based signaling devices, mobile devices, and point of sale (POS) terminal checkout lanes, the one or more devices being positioned throughout a store and configured to generate unstructured data and system-based inferences about activity in the store, a data store, and a computing system in communication with the one or more devices and the data store. The computing system can retrieve, from the data store, case files associated with the store, each of the case files documenting activity that poses a security threat by a user at the store, predict, based on applying one or more prediction models to each of the case files, future activity associated with the case file, the prediction models having been trained, using machine learning, to predict future activity based at least in part on a type of activity that poses a security threat documented in the case file, a quantity of stolen items associated with the case file, theft velocity, and a cost of stolen items associated with the case file, determine a threat score for each of the case files based at least in part on the predicted future activity associated with the case file, rank the case files associated with the store into a candidate list from highest threat score to lowest threat score, generate, based on applying one or more culling models to the ranked candidate list, a watch list for the store that includes a subset of the case files in the ranked candidate list, the culling models having been trained, using machine learning, to identify the subset of the case files posing a greatest current threat to the store, the greatest current threat to the store corresponding to a threshold time period, generate summary videos for each of the subset of the case files in the watch list, and transmit, to a user device, the watch list and the summary videos for presentation in a graphical user interface (GUI) display at the user device.

The system can optionally include one or more of the following features. For example, the computing system can also receive, from the one or more devices in the store, at least one of recent unstructured data and device-based inferences associated with one or more of the case files, adjust the threat scores of the one or more case files based on the at least one of recent unstructured data and device-based inferences, and adjust the rankings of the case files in the candidate list based on the adjusted threat scores of the one or more case files. The recent unstructured data can include at least one of a video feed of a user associated with a case file engaging in activity that poses a security threat in the store, location-based coordinates of the user associated with the case file moving throughout the store, location-based coordinates of a shopping cart used by the user while at the store, and a transaction receipt. The device-based inferences include a presumption, based on the recent unstructured data, that the user associated with the case file recently engaged in new activity that poses a security threat within another threshold time period.

In some implementations, the computing system can also adjust the threat scores of the one or more case files based on the at least one of recent unstructured data and device-based inferences and further based on increasing the threat scores based on the at least one of recent unstructured data and device-based inferences having a threat level indication above a predetermined threshold and decreasing the threat scores based on the at least one of recent unstructured data and device-based inferences having a threat level indication below the predetermined threshold.

As another example, the computing system can determine a threat score for each of the case files based on: assigning a threat score above a threshold score value based on determining that the predicted future activity associated with the case file exceeds a threshold suspicion level and assigning a threat score below the threshold score value based on determining that the predicted future activity associated with the case file is less than the threshold suspicion level. Sometimes, the computing system can determine a threat score for each of the case files based on assigning a threat score above a threshold score value based on determining that activity that poses a security threat documented in the case file occurred at stores within a threshold distance from the store and assigning a threat score below the threshold score value based on determining that the activity that poses a security threat documented in the case file occurred at stores outside of the threshold distance from the store.

The devices, system, and techniques described herein may provide one or more of the following advantages. For example, the disclosed technology provides for combining and correlating different forms of data, information, and system-generated inferences using objective factors. Labeling and classification techniques can be used to correlate the different types of information, which, at first blush, may not appear related to each other. As a result, security events can be more accurately identified and associated with guests who pose specific security threats. A case file generated for each guest who poses a specific security threat to a retail store, and each guest can be assigned a threat score indicating a threat level that the customer presents to the retail environment. Customers having threat scores within a threshold range can be ranked and returned to in-store employees in the form of a watch list. Such data-driven watch lists can be used to more effectively and accurately identify guests who pose a greatest security threat, monitor them, and potentially take action when warranted (i.e., alert retail security personnel to verify receipt upon exit, alert law enforcement when guest with outstanding security incidents is identified). As a result, potential future security events can be mitigated or otherwise prevented in the retail environment. Furthermore, such data-driven watch lists can be used to objectively monitor the guests who pose specific security threats. The in-store employees can therefore avoid using subjective factors and/or bias to identify guests who pose specific security threats based on human observations.

As another example, the watch lists can be short and digestible, thereby making it easier for the in-store employees to memorize or otherwise keep track of guests who pose specific security threats. The watch lists can identify the guests who pose the greatest security threat (e.g., customers having the highest threat scores). The watch lists therefore can be culled, instead of containing all guests who pose potential security threats, and the lists can be specific to individual retail stores. Culled watch lists can help the in-store employees more effectively focus on monitoring those customers presenting more substantial or significant threats to the retail environment. In some implementations, the in-store employees can receive updated watch lists every day. These watch lists can be easier to remember and digest since they may only list the guests who pose specific security threats that pose the biggest threat to the retail environment that day.

As another example, stitching together disparate pieces of data and information can be advantageous to predict likelihood of future activity of guests who pose specific security threats. Such data-driven, objective predictions can be used by the in-store employees to monitor the guests who pose specific security threats and take actions to resolve previous outstanding security events involving the guest and/or to prevent/mitigate potential future security events involving the guests. This can be advantageous to reduce or otherwise prevent security events from occurring in the retail environment.

The disclosed technology can also provide for dynamically updated watch lists. The watch lists can be updated based on new data and/or system-based inferences. The in-store employees can use the dynamically updated watch lists to monitor customers who ae current threats to the retail environment. In other words, the in-store employees can focus on monitoring customers who pose the biggest threats to the retail environment on any given day. The in-store employees may not be caught up monitoring customers who no longer present the biggest threats to the retail environment and instead can focus their efforts on preventing security events that may arise from the customers posing the biggest threats.

As yet another example, the disclosed technology can provide for generating summary videos that can be used by the in-store employees to more accurately monitor the guests who pose specific security threats. The summary videos can be included with the digestible watch list. The summary videos can include data and system-based inferences that objectively identify each guest who poses a security threat. Therefore, the in-store employees can use the summary videos to learn about the guests who pose specific security threats on the watch list. Using the summary videos, the in-store employees can more objectively remember, monitor, identify, and/or potentially intervene with (i.e., check receipt upon exit of store, alert law enforcement, apprehend) the guests who pose specific security threats that are on the watch list.

Associating unstructured data (e.g., raw data such as video feeds, images, location information) and system-based inferences (e.g., inferred conclusions such as a customer bypassing a scanner with a product) can also be advantageous to build robust, accurate, unbiased case files. Such case files can be assigned threat scores, as described throughout, and used to determine how whether a customer presents a big enough threat to a store to be put on the watch list for that store. The case files can identify guests who pose specific security threats without relying on subjective or biased visual observations made by the in-store employees. As a result, human-made bias in identifying and monitoring guests who pose specific security threats can be mitigated or otherwise avoided. Using objective identifiers, a guest who poses a security threat can be more easily identified. For example, the customer can change clothes or their hair color, which would make previous visual observations of that customer ineffective to identify the customer the next time they enter the store. However, if the customer uses the same credit card, phone, or car, identifiers associated with each of those can be used to positively and objectively identify the customer, even if they change their outward appearance.

The details of one or more implementations are set forth in the accompanying drawings and the description below. Other features and advantages will be apparent from the description and drawings, and from the claims.

BRIEF DESCRIPTION OF THE DRAWINGS

FIG. 8 is a flowchart of a process for dividing a watch list into multiple groups for in-store employees.

Like reference symbols in the various drawings indicate like elements.

DETAILED DESCRIPTION OF ILLUSTRATIVE EMBODIMENTS

This document relates to generating digestible watch lists of guests who pose specific security threats based on creating associations among different types of unstructured data (e.g., video, missed scan detection data, object mismatch data) and system-generated inferences that objectively identify actions or activity of guests who pose specific security threats. Case files can be generated for each guests who pose specific security threats. The case files can be assigned scores indicating a likely threat that the associated customer presents to the retail environment. The scored customers can then be ranked from highest threat score to lowest threat score. Guests who pose specific security threats having threat scores within a predetermined threshold range can be added to the watch list and provided to in-store employees whose jobs are related to security and safety in a retail environment. Therefore, the watch list can be culled and can include the customers posing the biggest threats to the retail environment. The culled watch list can be easier for in-store employees to digest, memorize, and/or remember. The in-store employees can use this watch list to effectively and objectively monitor and/or apprehend customers that pose the biggest threats to the retail environment.

Figure 1:
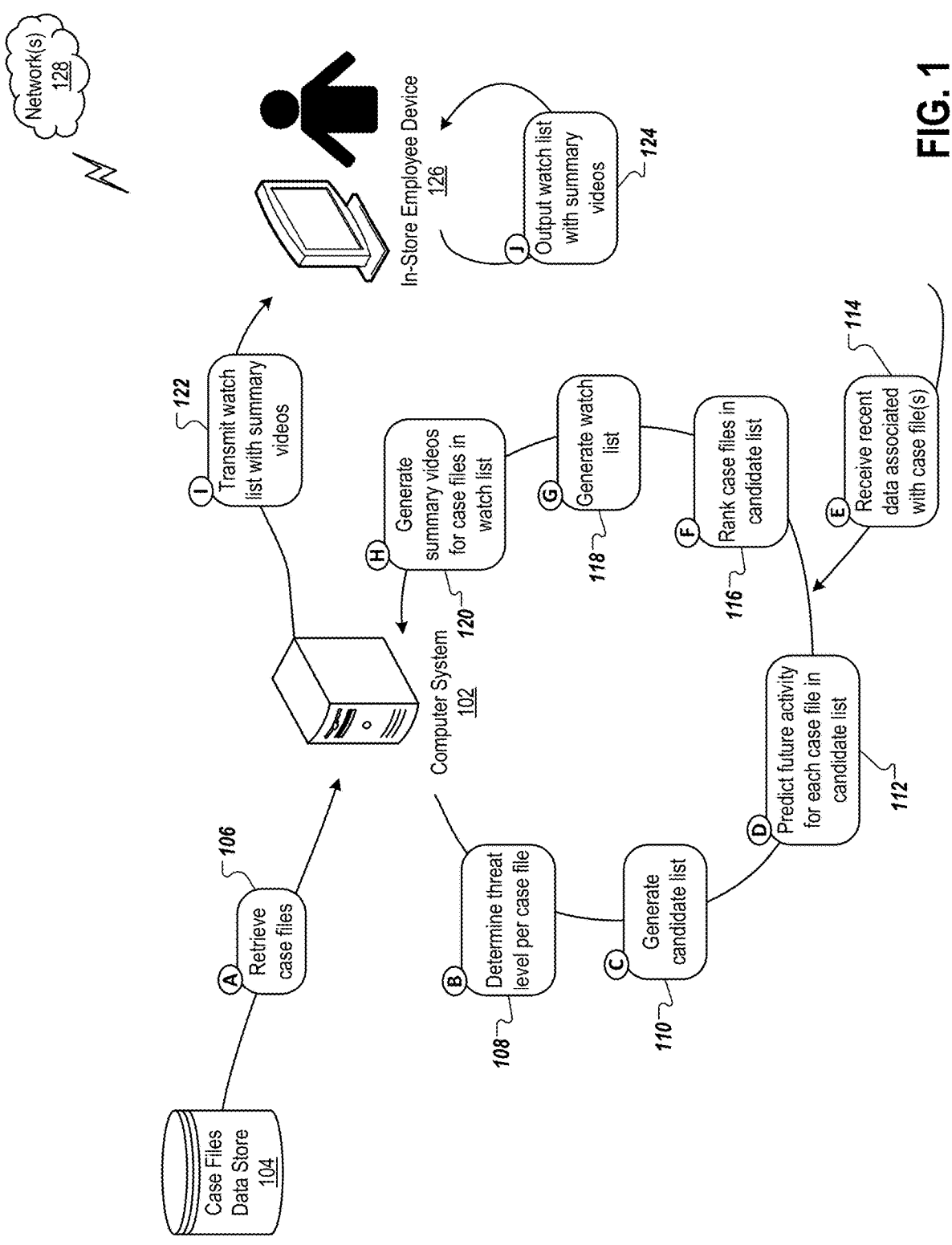
FIG. 1 is a conceptual diagram of generating a watch list for a store environment.

Referring to the figures, FIG. 1 is a conceptual diagram of generating a watch list for a store environment. A computer system 102 can be in communication (e.g., wired and/or wireless) with a case files data store 104 and an in-store employee device 126 via network(s) 128. In some implementations, the computer system 102 can be in communication with multiple in-store employee devices. The computer system 102 can also be a remote computing system in communication with in-store employee devices that are associated with a plurality of retail environments or stores. For example, the computer system 102 can be a central computing system configured to generate a watch list for each of the plurality of stores in a network of stores. The watch list generated for a particular store can then be transmitted to each in-store employee device that is located at or otherwise associated with the particular store. In some implementations, each of the plurality of stores in the network of stores can include a computer system that is configured to generate a watch list for that particular store.

The in-store employee device 126 can be a mobile device such as a smartphone, tablet, laptop, and/or computer. An in-store employee can use the device 126 in order to monitor activity in the store environment, including guests who pose specific security threats. The in-store employee can be tasked with ensuring safety and security in the store environment. For example, the in-store employee can be security and safety personnel. In some implementations, the device 126 can be in communication with a camera security system in the store environment. The in-store employee can view an image data feed from the camera security system at the device 126. The in-store employee can use the device 126 in order to identify guests who pose specific security threats, monitor them, and take some response action to such customers when they are engaged in or believed to be engaging in activity that poses a security threat.

Still referring to FIG. 1, the computer system 102 can retrieve case files from the case files data store 104 (step A, 106). Case files can be generated by the computer system 102 and/or one or more other computing systems. A case file, as described in reference to FIG. 2, can be generated for each customer in the store environment who engages in activity that poses a security threat, such as theft, shoplifting, sweethearting, battery, assault, etc. A case file can indicate information about the customer and activity that poses a security threat that the customer engaged in. For example, the case file can include objective identifiers that can be used to objectively identify the customer (e.g., MAC address, credit card number, license plate, etc.). The case file can also include data and/or system-based inferences about prior activity that poses a security threat of the customer. The case file can include image data (e.g., still images, video) depicting the customer as they engaged in the prior activity that poses a security threat. As described herein, the case file can be used to assess a threat level that the customer poses to the store environment. The customer may be added to a watch list for the in-store employee(s) depending on the customer's case file and threat level.

The computer system 102 can then determine a threat level for each of the retrieved case files (step B, 108). As described herein, threat level scores can be determined based on information in the case files (e.g., refer to FIGS. 3A-D). The threat level scores can be determined and updated based on (i) newly received data, such as images of the customer stealing another product at another time, and/or (ii) newly generated system-based inferences, such as a point of sale (POS) terminal determination that the customer swapped barcodes on products and therefore did not pay an actual price of a purchased product. A customer's threat level score can, for example, be higher than threat scores of other customers when the customer steals products that cost more, steals products more frequently within a predetermined time period, engages in battery, assault, or other physical contact with employees or other customers, has been apprehended in the past, etc. A customer's threat level score can, for example, be lower than threat scores of other customers when the customer steals infrequently or once within a predetermined time period, steals low-cost products, etc.

The computer system 102 can then generate a candidate list based on the scored case files (step C, 110). In other words, the computer system 102 can compile all of the scored case files into a list. The computer system 102 can put all of the scored case files into the candidate list. Thus, the candidate list can include all the case files that are scored. The candidate list may therefore include customers who pose a significant threat to the store environment as well as customers who pose a minimal threat to the store environment. The candidate list can include all the case files, regardless of recent or new activity that the customers associated with the case files may be engaging in. In some implementations, the computer system 102 can put case files having a threat level score within a predetermined range into the candidate list. In some implementations, the computer system 102 can also rank all of the case files in the candidate list based on their determined threat level scores. The case files can be ranked from highest to lowest threat level score.

The computer system 102 can also predict future activity that poses a security threat for each case file in the candidate list (step D, 112). The computer system 102 can apply one or more machine learning models to each case file to predict activity that poses a security threat. These predictions can be based on frequency of activity that poses a security threat, severity of activity that poses a security threat, types of items stolen, quantity of items stolen, value of items stolen, prior convictions, etc. Thus, the predictions can be generated based on associating an abundance of different data and system-based inferences in the case file. Using the abundance of different data and the system-based inferences, the computer system 102 can predict a likelihood that the associated customer will engage in future activity that poses a security threat with more accuracy. Predictions of future activity that poses a security threat can be used to rank the case files, as described further below.

The computer system 102 can receive recent data associated with one or more of the case files in the candidate list (step E, 114). Step E can at any time before or during steps A-D. The data can be received from one or more devices in the store environment, such as a camera, POS terminal, RFID reader, and/or location based signaling device. The data can also include system-based inferences made by the one or more devices in the store environment. The received data can include images of a customer associated with one of the case files stealing another item, an inference by the POS terminal indicating that a customer likely engaged in ticket swapping, etc. The recent data that is received in step E (114) can be used by the computer system 102 to rank the case files, as described below.

Based on the predicted future activity and/or received recent data, the computer system 102 can rank the case files in the candidate list (step F, 116). The computer system 102 can rank the case files from highest to lowest threat level score (e.g., refer to FIGS. 4A-B). The computer system 102 can also weigh one or more of the threat level scores based on the predicted future activity and/or received recent data.

For example, if recently received data indicates that a customer associated with a first case file was involved in another shoplifting event, then the computer system 102 can determine that the customer associated with the first case file poses a bigger threat to the store environment in comparison to a customer who has not recently engaged in another shoplifting event. Accordingly, the threat level score for the first case file can be weighted more than the threat level score of other case files. The first case file can be ranked higher in the candidate list than the other case files.

As another example, if the computer system 102 predicts that the customer associated with the first case file is not likely to engage in future activity that poses a security threat within a predetermined timeframe, then the computer system 102 can weigh the threat level score of the first case file less than the threat level score of other case files. The first case file can be ranked lower in the candidate list than the other case files.

The computer system 102 can generate a watch list (step G, 118). The watch list can be a culled version of the candidate list of ranked case files (e.g., refer to FIG. 5). Generating the watch list can include applying one or more machine learning models to the candidate list of the ranked case files. The models can be trained to identify which case files are associated with customers that pose the biggest threats to the store environment. For example, using the models, the computer system 102 can generate the watch list including case files having the highest ranked threat level scores. The watch list can also include case files having threat level scores within a predetermined threat level range. The watch list can also include a predetermined quantity of the ranked case files, such as top 10 ranked case files. The quantity of case files in the watch list can vary based on one or more factors, such as a business of the particular retail store, a severity or threat level associated with each of the ranked case files in the candidate list. As a result, a digestible watch list can be generated. A digestible watch list can be used by in-store employees to more easily and effectively monitor customers and apprehend the guests or customer who pose the greatest security threat to the retail store, its employees, and/or other guests.

The computer system 102 can also generate summary videos for each of the case files in the watch list (step H, 120). As described herein, the summary videos can include pieces of information from the case files that can be used by the in-store employees to objectively monitor and potentially intervene with (i.e., verify purchases upon exit, call law enforcement, apprehend) the guests who pose specific security threats. For example, the summary videos can include a compilation of images, videos, transaction receipts, license plate numbers, credit card numbers, etc. that uniquely and objectively identify the customer associated with the case file. The in-store employees can study the summary videos whenever they receive the watch list to learn about which guests who pose specific security threats they need to be monitoring that day. The summary videos can be short and concise, thereby presenting only relevant information needed to quickly and objectively identify the guests who pose specific security threats. Thus, the summary videos can be advantageous to assist the in-store employees to quickly and effectively monitor guests who pose specific security threats, identify the guests, and intervene with (i.e., apprehend or otherwise stop) the guests from engaging in activity that poses a security threat in the store environment.

In some implementations, guests can be objectively identified in a particular store and across a network of stores based on whether the guests connect to WIFI or other internet services that are provided in the stores. Using the MAC address of the guest's mobile device and a combination of other signals that are detected in the store, such as RFID and WIFI signals, the guest's location can be triangulated. The guest's MAC address can then be used as an objective identifier to identify the guest whenever they go to other stores.

The computer system 102 can then transmit the watch list with summary videos to the in-store employee device 126 (step I, 122). The watch list and summary videos can be transmitted to the device 126 every day. In some implementations, the watch list and summary videos can be transmitted at predetermined times. In yet some implementations, the watch list and summary videos can be transmitted whenever either of the watch list and/or the summary videos are updated by the computer system 102.

The in-store employee device 126 can output the watch list with the summary videos step J, 124). For example, the device 126 can output the watch list with the summary videos upon receiving them from the computer system 102. In some implementations, the device 126 can output the watch list with the summary videos at some predetermined time after receiving them from the computer system 102. For example, the device 126 can receive the watch list in real-time once the list is generated or updated by the computer system 102, however the device 126 may not output the updated watch list until the next day. Thus, every day, the in-store employee(s) can view the same version of the watch list as the prior day or an updated version of the watch list. This can be advantageous so as not to confuse the in-store employee(s) and to make it easier for the employee(s) to digest, memorize, and/or remember the guests who pose specific security threats on the watch list.

In some implementations, as described further in reference to FIG. 8 below, the computer system 102 can provide a watch list to the device 126 that includes all of the ranked case files in the candidate list. The device 126 can output the full/complete watch list so that the in-store employee(s) can review all guests who pose security threats. The computer system 102 can also group the ranked case files in the candidate list and assign each of the groups to one or more in-store employees. Instead of transmitting all of the case files to each of the devices 126 of the in-store employees, the computer system 102 can transmit the groups of case files that each of the in-store employees are assigned.

Steps A-J (108-124) can be continuously performed in a feedback loop. For example, the computer system 102 can continuously be updating threat level scores of one or more case files, generating new watch lists for one or more stores, and updating watch lists for one or more stores. For example, new watch lists can be generated any time that new case files are created for customers in a particular store. Existing watch lists for one or more stores can be updated whenever case files associated with those one or more stores are updated. Moreover, watch lists can be generated and/or updated whenever new data and/or system-based references are received about one or more case files. Dynamically generating and updating can be advantageous to provide in-store employees with digestible and most current watch lists. These watch lists can assist the in-store employees in more effectively performing their jobs and/or monitoring guests who pose specific security threats in the respective stores.

Figure 2:
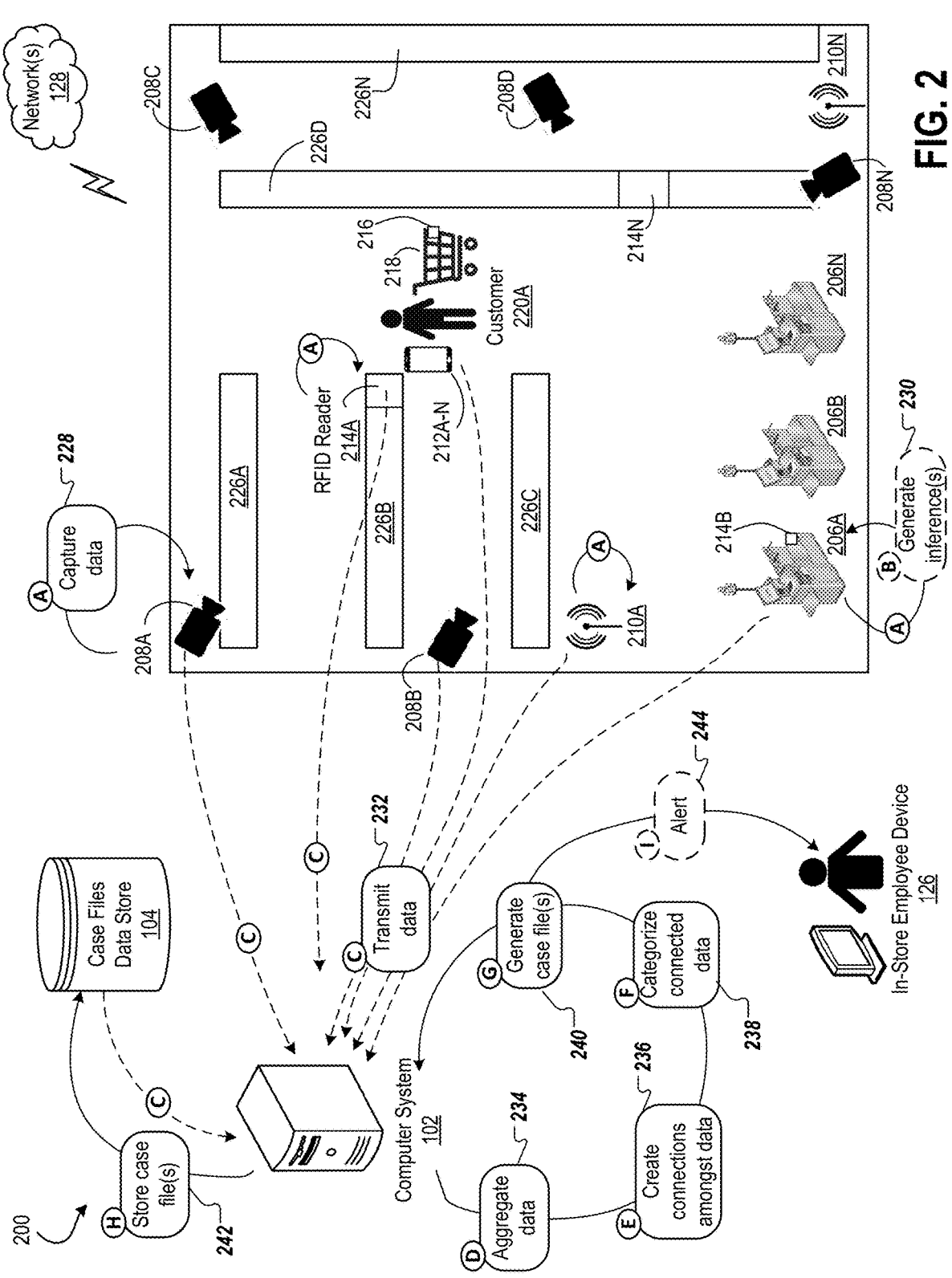
FIG. 2 is a conceptual diagram of generating case files for security events in a store environment.

FIG. 2 is a conceptual diagram of generating case files for security events in a store environment 200. The case files that are generated and described in FIG. 2 can be used by the computer system 102 in generating a watch list for the store environment 200. The computer system 102 can therefore generate a watch list for each store environment, based on data and system-based inferences that are made about customers in that particular store environment.

The store 200 can be a retail environment, such as a grocery store, clothing store, or other type of store. The store 200 can include shelves 226A-N. The shelves 226A-N can be arranged into aisles that customers can move up and down. The shelves 226A-N can include a variety of items that the customers can purchase. The store 200 can also include point-of-sale (POS) checkout lanes 206A-N. In some implementations, the POS checkout lanes 206A-N can be self-checkout lanes. One or more of the POS checkout lanes 206A-N can also be checkout counters with an employee who scans a customer's items from their cart.

The store 200 can also include different devices and/or systems that are placed throughout the store 200. The devices and/or systems can be used to track movement of customers and items in the store 200. The devices and/or systems can be edge devices that perform edge computing processing techniques. As described throughout this disclosure, the devices and/or systems can generate unstructured data as well as inferences based on the unstructured data. The devices and/or systems can be in communication with a computer system 102 via network(s) 128. The computer system 102 can be a central computing system, computer, server, and/or network of computers or servers. The devices and/or systems can transmit, to the computer system 102, the unstructured data and inferences. The computer system 102, as described herein, can further process the transmitted information to identify security events, build case files, and generate watch lists.

In some implementations, a first computing system can identify security events and build case files for all stores in a network of stores. A second computing system that is different than the first computing system can generate the watch lists for each store based on the case files built by the first computing system. The first and second computing systems can be in communication via the network(s) 128. In some implementations, the first computing system can generate case files for every store in a network of stores. A computing system in each of the stores can then generate watch lists for the respective store. In yet some implementations, a computing system in each store can be configured to generate case files and watch lists for the respective store. In some implementations, a computing system in each store can generate case files and another computing system can generate watch lists for all the stores in the network of stores. One or more other variations of computing systems can be used to perform the techniques disclosed and described herein.

Referring back to the store 200 in FIG. 2, the devices and/or systems placed throughout the store 200 can include cameras 208A-N, location-based signaling devices 210A-N, and RFID readers 214A-N. One or more additional or fewer types of devices and/or systems can be placed throughout the store 200.

The cameras 208A-N can be placed at various locations throughout the store 200. In the example of FIG. 2, camera 208A is placed near shelf 226A. Camera 208B is placed between shelves 226B and 226C. Cameras 208C and 208D are placed between shelves 226D and 226N. Moreover, camera 208N is placed near the POS checkout lanes 206A-N and the shelf 226D. The cameras 208A-N can be configured to continuously capture image and/or video data of the store 200. One or more of the cameras 208A-N can be high resolution cameras. One or more of the cameras 208A-N can be low resolution cameras. One or more of the cameras 208A-N can also be pan-tilt-zoom cameras. One or more of the cameras 208A-N can be wide angle cameras to capture more activity in the store 200. The cameras 208A-N can be any other camera configurations that are already installed in the store 200. For example, the cameras 208A-N can be part of a security camera system or CCTV system.

The location-based signaling devices 210A-N can also be placed at various locations throughout the store 200. In FIG. 2, device 210A is placed near the shelf 226C. Device 210N is placed between the shelves 226D and 226N. The devices 210A-N can be placed in various other locations as well. The devices 210A-N can be configured to identify when customers pass the devices 210A-N or are nearby the devices 210A-N. The devices 210A-N can generate timestamps indicating when a customer passes or is nearby. Moreover, the devices 210A-N can communicate with mobile devices of customers to identify locations of such customers in the store 200 and to associate the generated timestamps with the customers. For example, customer 220A has mobile device 212A. Mobile device 212A can be a cell phone, smartphone, laptop, tablet, or other mobile computing device that the customer 220A may bring with them to the store. If the customer 220A moves towards or comes into range with the location-based signaling device 210A, the location-based signaling device 210A can ping the mobile device 212A and receive a mobile device identifier, such as a MAC address. The MAC address can be correlated with a timestamp generated by the device 210A that indicates the customer 220A was nearby. Thus, the location of the customer 220A in the store 200 at a particular time can be documented by the device 210A using an objective identifier, the MAC address of the mobile device 212A.

The RFID readers 214A-N can also be positioned in various locations throughout the store 200. For example, RFID reader 214A is positioned at an end of the shelf 226B. RFID reader 214B is placed at or part of POS checkout lane 206A. RFID reader 214N is positioned along the shelf 226D. RFID readers 214A-N can be placed in various other locations throughout the store 200. The RFID readers 214A-N can be configured to detect when an RFID tag comes within a vicinity or range of the readers 214A-N. RFID tags can be attached to shopping carts, baskets, and other equipment used in the store 200. For example, the customer 220A can be pushing a shopping cart 218 around the store 200. The shopping cart 218 can have an RFID tag 216, which can be used to identify the shopping cart 218. Each shopping cart in the store 200 can have a unique RFID tag. In FIG. 2, as the customer 220A pushes the shopping cart 218 past or near the RFID reader 214A, the reader 214A can detect the RFID tag 216 on the shopping cart 218. The reader 214A can, for example, determine that the shopping cart 218 was near the shelf 226B at a time at which the reader 214A detected the RFID tag 216. Similarly, when the customer 220A moves the shopping cart 218 to the POS checkout lane 206A, the RFID reader 214B can detect the RFID tag 216 and identify that the shopping cart 218 is at the POS checkout lane 206A at a particular time.

Still referring to FIG. 2, one or more of the devices and/or systems 208A-N, 210A-N, 214A-N, and 206A-N can capture data (step A, 228). For example, the cameras 208A-N can continuously capture image and/or video data in their designated locations. The location-based signaling devices 210A-N can generate timestamps and indications of when customers, such as the customer 220A, passes by or comes into a range of the devices 210A-N. The RFID readers 214A-N can similarly generate timestamps and indications of when shopping carts having RFID tags, such as the shopping cart 218 having the RFID tag 216, come within range of the readers 214A-N. The POS checkout lanes 206A-N can also capture data such as scanned items, images of items in a customer's shopping cart, and transaction receipts/bills.

One or more of the devices and/or systems 208A-N, 210A-N, 214A-N, and 206A-N can also generate inferences based on the captured data (step B, 230). In some implementations, one or more of the devices may not generate inferences. One or more of the devices may only generate inferences when the devices determine there may be activity that poses a security threat based on the captured data.

For example, the customer 220A can scan products at the POS checkout lane 206A. The POS checkout lane 206A can include a camera configured to capture image data of an area around the POS checkout lane 206A. Using edge computing, the POS checkout lane 206A can analyze the image data and match it to barcodes of the products that the customer 220A scanned. The POS checkout lane 206A can determine that there is a mismatch between products that appear in the image data and products that are scanned. The mismatch can indicate that the customer 220A may be shoplifting. Accordingly, the POS checkout lane 206A can generate an inference that the customer 220A may be engaged in activity that poses a security threat.

As another example, the RFID reader 214A can identify that customer 220A passing by the shelf 226B with the shopping cart 218 at a first time. The customer 220A can continue moving between the shelves 226B and 226C. Once the customer 220A reaches the end of the shelves 226B and 226C, the customer 220A can decide to turn around, walking back the same way that they came. Thus, when the customer 220A reaches the end of the shelves 226B and 226C, the RFID reader 214A can identify the shopping cart 218 at a second time. Using edge computing, the RFID reader 214A can determine an amount of time that passed between the first time and the second time. The RFID reader 214A can infer, based on the amount of time that passed, whether the customer 220A spent longer between the shelves 226B and 226C than expected. If the customer 220A spent longer than expected, the RFID reader 214A can infer that the customer 220A may be engaged in activity that poses a security threat.

Alone, the RFID reader 214A's inference may not positively identify that the customer 220A in fact engaged in activity that poses a security threat. However, in combination with image data from the camera 208B, for example, the computer system 102 can determine that the customer 220A spent a longer time than expected between the shelves 226B and 226C because the customer 220A was looking at their mobile device 212A. Thus, the customer 220A did not in fact engage in activity that poses a security threat. As another example, in combination with the image data from the camera 208B, the computer system 102 can determine that the customer 220A spent a longer time because the customer 220A was trying to swap barcodes on two products. Thus, the computer system 102 can positively identify that the customer 220A engaged in activity that poses a security threat.

Still referring to FIG. 2, one or more of the devices and/or systems 208A-N, 210A-N, 214A-N, and 206A-N can transmit data to the computer system 102 (step C, 232). The data can include unstructured data that is captured by the devices and/or systems 208A-N, 210A-N, 214A-N, and 206A-N. The data can also include inferences that are generated by the devices and/or systems 208A-N, 210A-N, 214A-N, and 206A-N. The data can be transmitted at predetermined times. In some implementations, the data can be transmitted when requested by the computer system 102. In yet some implementations, the data can be transmitted as it is captured. For example, the cameras 208A-N can transmit live feeds of images and/or videos that are captured. As another example, the location-based signaling devices 210A-N can transmit location data whenever movement is detected within ranges of such devices 210A-N. The RFID readers 214A-N can also transmit data whenever RFID tags 216 of shopping carts 218 are detected within ranges of such devices 214A-N. Moreover, the POS checkout lanes 206A-N can transmit data, such as receipts, credit card information, scanned items, and inferences, whenever a transaction is made at such checkout lanes 206A-N.

The computer system 102 can also retrieve data from a data store 104. The data can include historic unstructured data, historic system-based inferences, structured data, and other data pertaining to security events and activity that poses a security threat in the store 200. All of the data that is received by the computer system 102 can be used to determine whether security events occurred and to generate case files for identified security events.

Thus, the computer system 102 can aggregate the data (step D, 234). The computer system 102 can compile and filter all of the data that was received. The computer system can also apply one or more machine learning-trained models to the unstructured data to add structure that data. Adding structure to the data can include labeling the data and classifying the data based on those labels. For example, a model can be trained to identify, from image data, a person peeling a barcode off of a product. The model can be applied to the image data received from the cameras 208A-N. Using the model, the computer system 102 can identify a moment in which the customer 220A in fact removed a barcode from one product and put it on another product. The computer system 102 can label this moment in the image data and classify it as a barcode swap or other activity that poses a security threat classifier.

Similarly, a model can be trained to identify, from POS transaction data and inferences, whether the customer 220A did not scan all products in the shopping cart 218 and/or whether the customer 220A scanned barcodes that do not match the products in the shopping cart 218 or otherwise at the POS checkout lane 206A. Using the model, the computer system 102 can label and classify the POS transaction data as indicative of a security event, such as shoplifting.

As another example, a model can be trained to stitch together different image data from the cameras 208A-N. Thus, the computer system 102 can apply the model to all of the received image data and output a continuous image feed tracking the customer 220A as they move throughout the store 200.

The computer system 102 can then create connections amongst the aggregated data (step E, 236). The computer system 102 can apply one or more machine learning-trained models to the aggregated data. For example, the models can be trained to correlate aggregated data based on their labels and/or classifications. Thus, if image data and POS transaction data both are labeled as barcode swap, the computer system 102 can determine that these two pieces of data correlate with each other.

As another example, the computer system 102 can create connections by correlating the aggregated data with the customer 220A. For example, using one or more models, the computer system 102 can correlate (1) a timestamp of an RFID reading from the RFID reader 214A with (2) image data of the customer 220A swapping a barcode on a product near the shelf 226B, and (3) a receipt from the POS checkout lane 206A. By correlating (1)-(3), the computer system 102 can positively identify that a barcode swap occurred and the customer 220A is involved in shoplifting. Moreover, by connecting and correlating (1)-(3), the computer system 102 can objectively identify the customer 220A by a credit card number or a customer number from the receipt. Such objective identification can be used to track the customer 220A in the future and potentially stop the customer 220A from committing any additional crimes.

The computer system 102 can categorize the connected data (step F, 238). Categorizing the data can include determining a severity of the activity that poses a security threat that is inferred from connecting the data. For example, the computer system 102 can determine whether the customer 220A's shoplifting amounts to a crime according to state law, local laws, federal law, store policies, and/or other protocol and procedures. Categorizing the data can be location-based and/or store site specific. For example, a business can have multiple stores 200 across the country. The stores 200 located in a first state can have certain rules about dealing with activity that poses a security threat that the stores 200 in a second state may not have. In some implementations, categorizing the data can also include determining whether the connected data actually represents product shortages that are not tied to criminal activity or other security events.

Once the data is categorized, the computer system 102 can generate case files (step G, 240). A case file can be generated per identified security event/activity that poses a security threat. When multiple case files are generated that involve the same customer, the case files can be linked together. In some implementations, a case file can be generated per customer that is involved in identified security events/activity that poses a security threat. Thus, the case file can include an aggregate of all the security events associated with that customer. Whenever a security event is identified, it can be added to the customer's case file.

The computer system 102 can store the case file(s) in the data store 104 (step H, 242). The case file(s) can be retrieved by the computer system 102 and used in further analysis. For example, the computer system 102 can transmit an alert to an in-store employee device 126 (step 1, 244). The computer system 102 can determine whether the case file indicates a security event that warrants intervention or review the in-store employees. The computer system 102 can apply one or more machine learning trained models to the case file(s). Using the models, the computer system 102 can assess a severity of the security event(s) outlined in the case file(s). The computer system 102 can assess the severity of the security event(s) relative to rules based on jurisdiction, state law, federal law, store policies, and/or other protocol and procedures.

If the computer system 102 determines that the in-store employees should be alerted, then the computer system 102 can generate one-click security reports that get reported out. The reports can be generated based on the case file(s). The reports can provide a snapshot of the security event and objective identifiers that can be used to identify the customer involved in the security event. Thus, the reports can include necessary information that can be used by the in-store employees to objectively and unbiasedly identify and stop the customer 220A at a time that the security event occurs or at a future time.

As described herein, the steps A-I (228-244) can be performed by the computer system 102 before generating a watch list for the store 200 (e.g., refer to FIG. 1). One or more of the steps A-I (228-244) can also be performed at the same or similar time as the computer system 102 generates or updates the watch list for the store 200. For example, the computer system 102 can simultaneously generate case files using the steps A-I (228-244) in FIG. 2 and generate or update watch lists using the steps A-J (106-124) in FIG. 1. As another example, in reference to FIG. 1, the computer system 102 can receive recent data associated with case files (step E, 114) after devices and/or systems such as the cameras 208A-C and the POS checkout lane 206A capture data (step A, 228, in FIG. 2) and/or generate inferences (step B, 230, in FIG. 2). As yet another example, the computer system 102 can receive new case files whenever they are generated using the steps A-I (228-244) in FIG. 2 and then generate or update a watch list with the new case files using the steps A-J (106-124) in FIG. 1.

FIGS. 3A-D is a flowchart of a process 300 for scoring a case file. As described herein, the process 300 can be performed by the computer system 102. One or more blocks of the process 300 can also be performed by another device, computer, computing system, server, and/or network of computers and/or servers. For illustrative purposes, the process 300 is described from the perspective of a computer system.

The process 300 can be performed to assign a threat level score to each case file associated with a particular store. Threat scores can be specific to particular stores. For example, a case file can be associated with one customer who was involved in shoplifting in a first store and a second store. The computer system can assign this case file 2 threat scores, where a first threat score is associated with a threat level that the customer poses to the first store and a second threat score is associated with a threat level that the customer poses to the second store. The first and second threat scores can be different. The first and second threat scores can vary depending on one or more factors relevant to each of the stores, such as types of items stolen, quantity of items stolen, cost of items stolen, prior thefts in the store(s), location of the store(s), jurisdiction of the store(s), etc. In some implementations, the first and second threat scores can be the same. In yet some implementations, the case file can be assigned one threat score that quantifies a threat level that the customer poses to all stores in a network of stores and/or all stores within a predetermined distance/geographic area from a store where the customer engaged in activity that poses a security threat (e.g., shoplifting).

Referring to the process 300 in FIGS. 3A-D, the computer system can select a store from a plurality of stores in 301. As mentioned above, the computer system can determine threat scores for case files associated with each store. The determined threat scores can then be used to generate a watch list for the particular store. In-store employees in the particular store can focus on monitoring customers on the watch list for that particular store rather than customers that may pose threats to a variety of stores. This can be advantageous to assist the in-store employees in more easily and effectively reviewing and remembering which customers pose threats to the particular store. The watch list can therefore help the in-store employees focus their efforts on preventing or otherwise mitigating security events that may occur in the particular store.

In some implementations, the computer system can select a group or subset of stores from the plurality of stores in 301. The computer system can determine threat scores for the selected group of stores. Stores can be grouped together based on geographic location/proximity to each other, in-store policies and/or procedures, local jurisdiction rules, etc. As an example, in some implementations, stores in the group may be geographically close to each other. Customers may go to all the stores in the group. All the stores in the group may also rotate the same in-store employees and/or have the same safety and security policies and procedures. It can be advantageous in such an illustrative example to identify threat levels, by the computer system that guests who pose specific security threats pose to this group of stores rather than each individual store. After all, the guests who pose specific security threats can pose the same threat to the group of stores and it can be preferred to provide the in-store employees with one watch list of guests who pose specific security threats that applies to the group of stores. The one watch list can be less confusing for the in-store employees to memorize or otherwise digest. The in-store employees can therefore digest the one watch list and apply that watch list to the group of stores that the in-store employees work at.

Once the computer system selects a store from the plurality of stores, the computer system can retrieve case files associated with the selected store (302). The computer system can retrieve the case files from the case files data store 104 described herein (e.g., refer to FIGS. 1-2, 6). Each of the case files can be associated with both a customer and a particular store. Each case file can represent one security event/activity that poses a security threat (e.g., shoplifting) that the customer engaged in at the particular store. Each case file can also represent all of the security events that the customer engaged in at one or more stores. For example, the case file can represent all security events that the customer engaged in at a particular store. As another example, the case file can represent all security events that the customer engaged in at multiple stores. In such an example, the same case file can be retrieved each time that the computer system selects a different store and scores the case file for that selected store.

The computer system can then select a case file in 304. Accordingly, the computer system can assign a threat level score to the selected case file. As described herein, the threat level score can be a numeric value. The numeric value can be in a range of values, such as 0-100. One or more other ranges of numeric values can be used by the computer system. In some implementations, the threat level score can be a string value indicating a threat level. The string values can include but are not limited to: minimal threat, no threat, smallest threat, mid level threat, large threat, biggest threat, etc.

The computer system can determine whether new evidence is associated with the case file (306). For example, the computer system can determine whether additional data and/or system-based inferences have been added to the case file since a last time that the computer system scored that case file. As another example, the computer system can determine whether it has received additional data and/or system-based inferences that correspond to the selected case file. As described throughout, the new evidence can be received from one or more devices and/or systems positioned throughout a store environment. The new evidence can include image data, received from one or more cameras, of the customer associated with the case file swapping barcodes on items in the selected store. The new evidence can also include an inference made by a POS checkout lane in the selected store that the customer engaged in ticket swapping. The new evidence can also include data indicating activity that poses a security threat of the customer in other stores in a network of stores.

If there is new evidence associated with the case file, then the computer system can determine whether the new evidence increases a current threat level associated with the case file (308). For example, the computer system can apply one or more machine learning models to the new evidence to assess a severity of activity that is represented by the new evidence. For example, a threat level of a case file can be low where the associated customer stole toiletries. However, if the new evidence indicates that the customer stole an expensive item (e.g., a TV) since the last time the threat level was calculated for that case file, the computer system can determine in 308 that this most recent theft makes the customer a greater threat to the store. After all, the customer is continuing to steal items at the store and is stealing more expensive items. Accordingly, the computer system can increase the threat score for the case file in 310.

In implementations where the case file has not yet been assigned a threat score, the computer system can assign a threat score that is above a predetermined threshold in 310. Scores below the predetermined threshold can indicate a smaller threat to the store while scores above the predetermined threshold can indicate a bigger threat to the store. The predetermined threshold can be different based on the store.

On the other hand, if the new evidence does not increase the threat level associated with the case file in 308, then the computer system can determine that the threat level score should not be changed. The computer system can proceed to block 312, described below. As an example, if the new evidence indicates that the customer has not stolen any items since the last time the threat level was calculated for that case file, the computer system can determine in 308 that the customer does not pose as much of a threat to the store. In this example, the computer system can determine that the new evidence is neutral, and therefore does not affect or otherwise cause a change to be made to the current threat level for that case file. In implementations where a threat score has not yet been assigned to the case file, the computer system can assign a low threat score to the case file. As described above, the low threat score can be below the predetermined threshold. In yet some implementations, the computer system may not assign any threat score to the case file if the case file does not yet have a threat score and the computer system determines that the new evidence does not increase a threat level associated with the case file.

Referring back to block 306, if the computer system determines that there is no new evidence associated with the selected case file, then the computer system can proceed to block 312. The threat score associated with the case file does not need to be changed since no new evidence warrants re-assessing the threat level posed by the case file.

In 312, the computer system can retrieve prediction model(s). The prediction model(s) can be retrieved from a data store, such as models data store 600 depicted in FIG. 6A. The prediction model(s) can be used by the computer system to assess a threat level of the selected case file. For example, the prediction model(s) can be used to predict whether the customer associated with the selected case file is likely to engage in activity that poses a security threat at a future time and/or during a predetermined timeframe. The prediction model(s) can also be used to assess data, system-based inferences, and/or new evidence associated with the case file to determine the threat level score for the case file. The prediction model(s) can be trained using machine learning techniques and algorithms, such as a convolution neural network (CNN), and training datasets that associate different types of data, system-based inferences, and/or evidence with different threat levels. In some implementations, the computer system can select the prediction model(s) based on information contained in the case file. For example, if new evidence is associated with the case file, the computer system can select one or more prediction models that can be used to predict a likelihood that, based on the new evidence, the customer is likely to engage in future activity that poses a security threat. In some implementations, the computer system can select the same prediction model(s) for all case files associated with the selected store. For example, the selected store can have a policy that requires all case files to be assessed with the same prediction model(s). Each store can have different policies about which prediction models are selected and used to score the case files.

Using the retrieved prediction model(s), the computer system can predict a likelihood of future activity that poses a security threat associated with the selected case file (314). Predictions of likelihood of future activity that poses a security threat can be data-driven and therefore based on objective factors rather than human-based observations and/or subjective determinations. Therefore, threat level assessment of customers may be less biased, more effective, and/or more accurate. As an example, likelihood of future activity that poses a security threat can be predicted based on whether the customer has engaged in activity that poses a security threat since a last time that the threat score was assessed for the case file. Increased velocity of theft or other activity that poses a security threat over a predetermined timeframe can also result in an increased likelihood that the customer will engage in future activity that poses a security threat. Infrequent, sporadic, or one-time theft or other activity that poses a security threat over the predetermined timeframe can result in a decreased likelihood that the customer will engage in future activity that poses a security threat. As another example, if the customer has been apprehended for their prior actions and continued to engage in activity that poses a security threat thereafter, there can be an increased likelihood that the customer will engage in future activity that poses a security threat.

The predicted likelihood of future activity that poses a security threat can be a numeric value. This prediction can also be a Boolean value and/or a string value. As non-limiting examples, the numeric values can include a range of numbers such as 0-100, where 0 can be a lowest likelihood of future activity that poses a security threat and 100 can be a highest likelihood of future activity that poses a security threat. As another non-limiting example, Boolean values can include True and False, where True indicates a likelihood of future activity that poses a security threat and False indicates no or low likelihood of future activity that poses a security threat. As yet another non-limiting example, string values can include "lowest likelihood of future activity that poses a security threat," "highest likelihood of future activity that poses a security threat," "some likelihood of future activity that poses a security threat," etc.

Next, the computer system can determine whether the predicted likelihood of future activity that poses a security threat exceeds a threshold level in 316. The threshold level can be determined on a store-by-store basis. For example, one store can have a higher threshold level than another store. The higher threshold level can be based on jurisdiction, state, and/or local laws and policies with regards to reporting and responding to security events. The threshold level can also vary depending on one or more other factors, such as types of items stolen, types of future activity that poses a security threat, severity of future activity that poses a security threat, severity of already-reported activity that poses a security threat, type of already-reported activity that poses a security threat, etc. For example, the threshold level can be lower for activity that poses a security threat that involves battery, assault, or other physical interaction with employees and other customers. Even if there is a low likelihood of future activity that poses a security threat, the customer who steals and is involved in social interaction may pose a greater threat to the store in the future, thus the threshold level can be lower. In other words, if the customer assaulted an in-store employee during a theft and the computer system predicts a moderate likelihood that the customer will engage in future activity that poses a security threat, the customer may still pose a greater threat to the store than a customer who engages in theft without any assault but is predicted to likely engage in more activity that poses a security threat. After all, the threshold level for theft with assault can be lower than a threshold level for just theft, thereby requiring a greater likelihood that theft alone will result in the customer engaging in future activity that poses a security threat before the customer can be considered a greater threat to the store.

Accordingly, if the computer system determines that the predicted likelihood of future activity that poses a security threat exceeds the threshold level in 316, then the computer system can increase the threat score for the case file (318). In other words, since the customer is more likely to engage in future activity that poses a security threat, the customer poses a greater threat to the store. Hence, the case file's threat score should be increased. The computer system can then proceed to block 320, described below.

As described herein, the threat score can be increased using a variety of different incremental adjustments.

Returning to 316, if the computer system determines that the predicted likelihood of future activity that poses a security threat does not exceed the threshold level, then the computer system can proceed to block 320. In other words, the computer system can determine that it is unlikely that the customer will engage in future activity that poses a security threat or that the likelihood is very low (e.g., below the predetermined threshold level). Thus, the computer system can determine that the threat score associated with the case file does not need to be increased or otherwise adjusted. In some implementations, the computer system can optionally decrease the threat score associated with the case file.

In 320, the computer system can determine whether activity that poses a security threat in the case file occurred in stores that are within a threshold distance from each other. The threshold distance can be different on a store-by-store basis. For example, a network of stores in a city can have a smaller threshold distance than a network of stores in a rural area. If the selected store is in a city, then the smaller threshold distance can be used. Therefore, the computer system can determine whether the customer engaged in activity that poses a security threat at stores in the network of stores within the smaller threshold distance (e.g., a 5 mile radius from the selected store). The threshold distance can also be determined based on one or more other factors, such as store policies, enterprise policies, state/local/jurisdiction policies and procedures, etc. Moreover, the threshold distance can vary depending on size of a region, whether regions are defined by cities, towns, or other geographic areas, whether customers are able to move around easily to travel to different stores or whether customers are unable to move around easily and therefore can travel to fewer stores, and how many stores are nearby a particular score. A customer can be considered a greater threat to the selected store if the customer engaged in activity that poses a security threat in nearby stores in the network of stores.

As mentioned, the case file can include all activity that poses a security threat associated with a particular customer. Sometimes, the customer can engage in activity that poses a security threat in one store but sometimes the customer can also engage in activity that poses a security threat in plurality of different stores. If the stores are geographically closer to each other, then the computer system can determine that the customer poses a greater threat to the selected store. In other words, the selected store can be geographically proximate to the other stores where the customer engaged in activity that poses a security threat and therefore it can be likely that the customer will also engage in activity that poses a security threat at the selected store. If, on the other hand, the selected store is geographically far away from all the other stores where the customer engaged in activity that poses a security threat, it can be less likely that the customer will pose a threat to the selected store.

For example, if the case file indicates that the customer shoplifted multiple times in stores in state A and shoplifted once in the selected store, which is located in state B, then the computer system can determine that the customer does not pose a great threat to the selected store in state B. If anything, the customer may pose a greater threat to each of the stores in state A where the customer previously shoplifted. If the stores in state A are geographically close to each other, the customer may pose an even greater threat to those stores since it can be more likely that the customer will continue to shoplift from those stores.

Accordingly, if the computer system determines that the activity that poses a security threat in the case file occurred in stores within the threshold distance (320), the computer system can increase the threat score for the case file in 322. The computer system can then proceed to block 324, discussed below. In other words, the computer system can determine that the customer poses a big enough threat to the store to warrant increasing the threat score associated with the customer's case file. The customer engaged in activity that poses a security threat in stores that surround the selected store, and therefore poses a greater threat to the selected store. The customer can also pose a security threat to surrounding stores and/or regions. For example, if the threat score is increased for the case file because the suspicious activity in the case file occurred in stores within a threshold distance, then the case file can also be identified for the other stores within the threshold distance as posing a potential threat to those stores. As a result, in-store employees at the other stores can also become aware of the customers who pose threats in surrounding stores. In some implementations, the threat score can also be increased more for stores that are closer to where the suspicious activity occurred in comparison to stores that are farther away from the suspicious activity.

If the computer system determines that the activity that poses a security threat in the case file occurred in stores that are not within the threshold distance (320), the computer system can proceed to block 324. In other words, the computer system can determine that the customer does not pose a big enough threat to the store to warrant increasing the threat score associated with the customer's case file. The customer may have engaged in activity that poses a security threat in other stores, but these stores may be far away from the selected store, thereby indicating that the customer does not pose a great threat to the selected store.

In 324, the computer system can determine whether the customer associated with the case file has been apprehended. Apprehending the customer can include one or more in-store employees stopping the customer while they are in the act of engaging in activity that poses a security threat. Apprehending the customer can also include preventing the customer from leaving the store after they commit the activity that poses a security threat. Apprehending the customer can also include some form of detainment of the customer by the in-store employee(s) and/or law enforcement. In yet some implementations, apprehending the customer can merely include monitoring the customer and/or providing them with a warning that their activity is a security threat.

In some implementations, if the customer is currently apprehended, the customer may no longer pose a significant threat to the store (e.g., or may pose a lesser threat to the store until a time at which the customer is no longer apprehended). If the customer has been apprehended in the past but is not currently apprehended, then the customer may also pose a less significant threat to the store. However, in some implementations, if the customer was been apprehended in the past and recently engaged in more activity that poses a security threat, then the customer may pose a more significant threat to the store. This can indicate that the customer was not deterred from engaging in the activity that poses a security threat based on being previously apprehended.

Accordingly, if the computer system determines that the customer has been apprehended, the computer system can decrease the threat score for the case file in 326. The computer system can then proceed to block 328, discussed below. In other words, the computer system can determine that the customer poses less of a threat to the store and therefore does not warrant increasing the threat score of the associated case file. The threat level score can be decreased because the customer may be less likely to commit activity that poses a security threat if the customer has already been apprehended for past activity. In examples described above where the customer was apprehended and continued to engage in activity that poses a security threat, the threat score of the associated case file can be increased.

If the computer system determines that the customer has not been apprehended (324), the computer system can proceed to block 328. In other words, the computer system can determine that because the customer has not been apprehended in the past, it is uncertain whether that means the customer is a greater threat to the store or whether the customer has not engaged in severe enough activity to warrant being apprehended. Thus, no adjustment may be made to the threat score of the associated case file.

In 328, the computer system can determine whether the activity that poses a security threat in the case file involves theft of one or more of a first predetermined category of items. The first predetermined category of items can vary based on store. The first predetermined category of items can include items that, although stolen, may not be the most expensive items in the store. In other words, the first predetermined category of items can include items that, when stolen, may not make the customer appear as a greater threat to the store. For example, the first predetermined category of items can include necessity items, such as fresh produce, fresh meats, tooth paste, tooth brushes, Band-Aids, etc. If a customer steals a necessity item, the customer may pose less of a threat to the store because the customer is stealing an item that they may need to live. As another example, if the first predetermined category of items includes items that all cost less than $5, a customer who steals one or more of such items may not pose a great threat to the store (e.g., unless, for example, a cost of a total quantity of such items that are stolen exceeds a threshold value).

Thus, if the computer system determines that the activity that poses a security threat involves theft of items from the first predetermined category of items (328), then the computer system can decrease the threat score for the case file in 330. As described above, the computer system can determine that the customer poses a lesser threat to the store. The computer system can proceed to block 332, described below.

On the other hand, if the computer system determines that the activity that poses a security threat does not involve items from the first predetermined category of items (328), the computer system can proceed to block 332, without adjusting the threat score of the case file.

In 332, the computer system can determine whether the activity that poses a security threat in the case file involves theft of one or more of a second predetermined category of items. The second predetermined category of items can vary based on store. The second predetermined category of items can include items that are the most expensive items in the store or having prices that exceed a threshold value. The second predetermined category of items can also include items that are frequently stolen at the particular selected store and/or across a network of stores. In other words, the second predetermined category of items can include items that, when stolen, may make the customer appear as a greater threat to the store.

For example, the second predetermined category of items can include electronics costing more than a threshold value, such as TVs, computers, and smartphones. If a customer steals a TV, the customer may pose a greater threat to the store since the customer may steal additional items that exceed the threshold value of the items in the second category. Theft of the TV can also indicate that the customer may steal more items from the store, regardless of whether those items are in the second predetermined category of items.

Thus, if the computer system determines that the activity that poses a security threat involves theft of items from the second predetermined category of items (332), then the computer system can increase the threat score for the case file in 334. As described above, the computer system can determine that the customer poses a greater threat to the store. The computer system can proceed to block 336, described below.

On the other hand, if the computer system determines that the activity that poses a security threat does not involve items from the second predetermined category of items (332), the computer system can proceed to block 336, without adjusting the threat score of the case file.

In 336, the computer system can determine whether a quantity of items stolen by the customer exceeds a threshold level. As described throughout this disclosure, the threshold level can be different on a store-by-store basis. The threshold level can also be based on a type of item(s) stolen by the customer. For example, the threshold level can be higher for necessity items such as tooth brushes and tooth paste than a threshold level for electronics such as TVs and computers.

In this example, the customer would have to steal more necessity items than TVs for the theft of necessity items to pose the customer as a bigger threat to the store.

Accordingly, if the computer system determines that the quantity of items stolen exceeds the threshold level (336), the computer system can increase the threat score for the case file in 338. The computer system can then proceed to block 340, discussed below. In other words, the computer system can determine that the customer poses a big enough threat to the store to warrant increasing the threat score associated with the customer's case file.

If the computer system determines that the quantity of items stolen does not exceed the threshold level (336), the computer system can proceed to block 340. In other words, the computer system can determine that the customer does not pose a big enough threat to the store to warrant increasing the threat score associated with the customer's case file.

In 340, the computer system can determine whether the activity that poses a security threat in the case file increased over a predetermined timeframe. The predetermined timeframe can vary. The predetermined timeframe can change based on the selected store. For example, in some implementations, the predetermined timeframe can be a week, a month, and/or multiple months. The computer system can determine whether the activity that poses a security threat increased more than a predetermined range during the timeframe. This determination can also refer to a activity that poses a security threat velocity. In other words, if the activity that poses a security threat continues or otherwise increases over the predetermined timeframe (e.g., theft velocity increases), then the computing system can determine that the customer associated with the case file poses a bigger threat to the store. On the other hand, if the activity that poses a security threat occurs less or otherwise stops during the predetermined timeframe (e.g., theft velocity decreases), then the computing system can determine that the customer associated with the case file poses a smaller threat to the store.

Accordingly, if the computer system determines that the activity that poses a security threat in the case file increased (340), the computer system can increase the threat score for the case file in 342. The computer system can then proceed to block 344, discussed below. In other words, the computer system can determine that the customer poses a big enough threat to the store to warrant increasing the threat score associated with the customer's case file.

If the computer system determines that the activity that poses a security threat in the case file did not increase (340), the computer system can proceed to block 344. In other words, the computer system can determine that the customer does not pose a big enough threat to the store to warrant increasing the threat score associated with the customer's case file.

In 344, the computer system can determine whether theft frequency of the case file is within a predetermined range. The predetermined range can vary based on a variety of factors, including but not limited to policies of the selected store, type of items stolen, quantity of items stolen, price of items stolen, and/or local/jurisdiction rules and laws. In some implementations, the block 344 can be the same as the block 340. In some implementations, the block 340 can refer to different types of activity that poses a security threat, including but not limited to theft, assault, battery, and other events that can comprise safety and security of the store.

In 344, the computer system can determine whether theft incidents in the case file occurred frequently enough to warrant increasing the threat score of the case file. For example, if the customer associated with the case file only stole items once, this theft frequency can be lower than the predetermined theft frequency range and therefore may not warrant increasing the threat score for the case file. After all, the customer may not pose a big enough threat to the store. On the other hand, if the customer stole items multiple times and, for example, the stolen items cost more than a predetermined value, then the customer's theft frequency may fall within the predetermined theft frequency range. In such a scenario, the threat score for the case file can be increased since the customer may pose a bigger threat to the store.

Accordingly, if the computer system determines that the theft frequency is within the predetermined range (344), the computer system can increase the threat score for the case file in 346. The computer system can then proceed to block 348, discussed below. In other words, the computer system can determine that the customer poses a big enough threat to the store to warrant increasing the threat score associated with the customer's case file.

If the computer system determines that the theft frequency is not within the predetermined range (344), the computer system can proceed to block 348. In other words, the computer system can determine that the customer does not pose a big enough threat to the store to warrant increasing the threat score associated with the customer's case file.

In 348, the computer system can output the threat score for the case file. Outputting the threat score can include storing the threat score in a data store. The outputted threat score can then be used by the computer system in order to rank the case files in a watch list.

The computer system can then determine whether there are more case files to score (350). If there are more case files to score, the computer system can return to block 304, select a case file, and repeat 304-346 until no more case files need to be scored.

If there are no more case files to score, the computer system can return to block 301 and select a store from the plurality of stores. The computer system can then repeat blocks 302-348 for each case file associated with the newly selected store. The computer system can repeat the process 300 until all case files associated with all the stores in the plurality of stores have been scored. In some implementations, if there are no more case files to score for the selected store in 348, the process 300 can stop. For example, the computer system may only score case files for a particular store rather than all the stores in the plurality of stores. The computer system may receive, from a device at the particular store (e.g., an in-store employee device), a request for scored and ranked case files associated with the particular store. Thus, the computer system may perform the process 300 for just the particular store. In yet some implementations, the computer system may continuously perform the process 300 for all of the stores in the plurality of stores. The computer system can also perform the process 300 at predetermined times and/or when new case files are generated and/or existing case files are updated.

Moreover, blocks 306-346 can be performed in any order. In some implementations, only some of the blocks 306-346 may be performed. For example, one or more of the blocks 306-346 can be performed for scoring case files at a first store while one or more of the same or other blocks 306-346 are performed for scoring case files at a second store. The blocks 306-346 can therefore be performed based on a store-by-store basis. In some implementations, one or more of the blocks 320-346 can be performed by the computer system to predict the likelihood of future activity that poses a security threat (306). For example, the computer system can predict the likelihood of future activity that poses a security threat of a case file based on whether the activity that poses a security threat in the case file occurred in stores within the threshold distance (320), whether the customer associated with the case file was apprehended (324), whether the activity that poses a security threat in the case file involved theft of a first and/or second category of items (328, 332), the quantity of items stolen (336), theft velocity (340), and/or theft frequency (344).

Figure 4A:
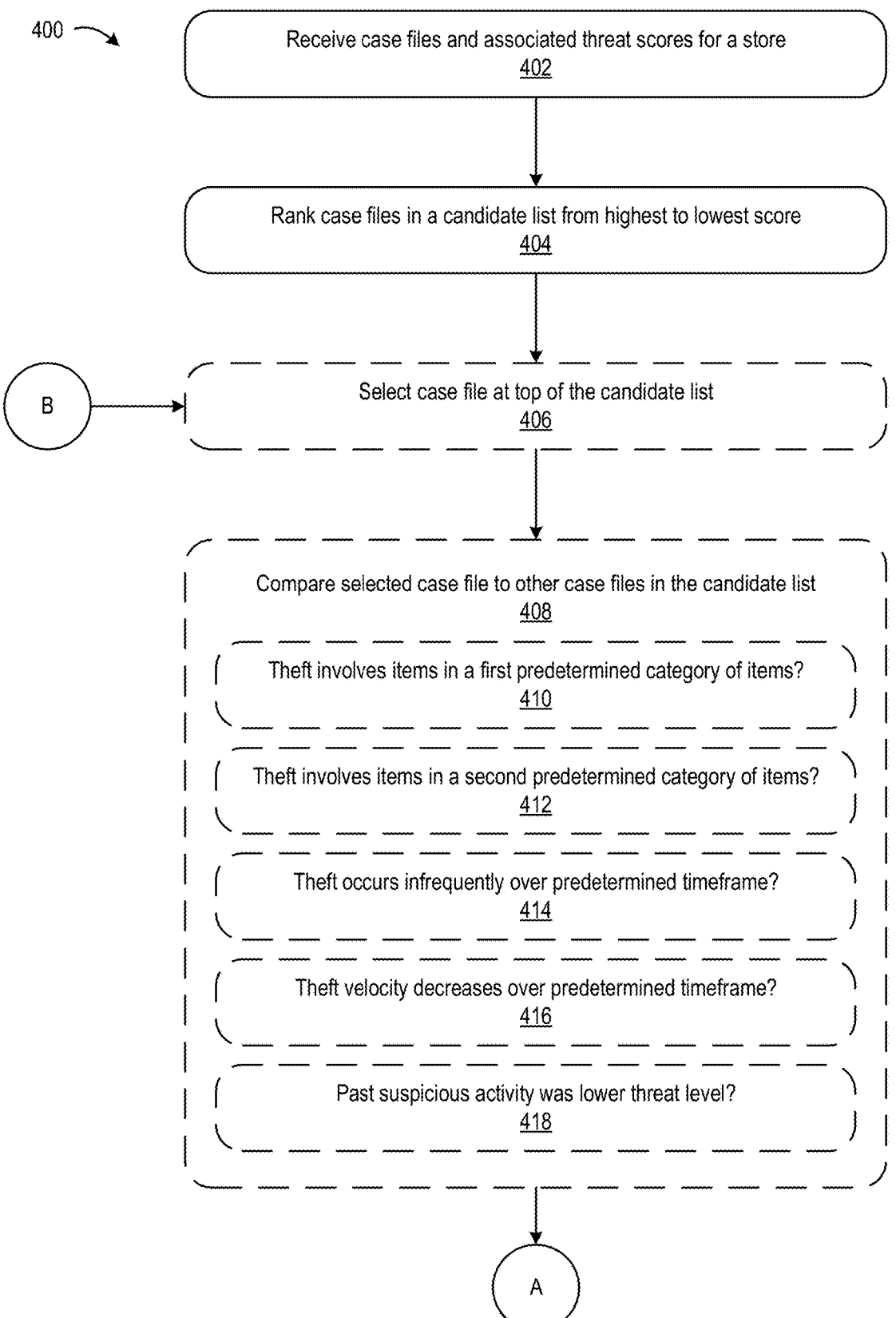
FIGS. 4A-B is a flowchart of a process for ranking case files in a watch list.
Figure 4B:
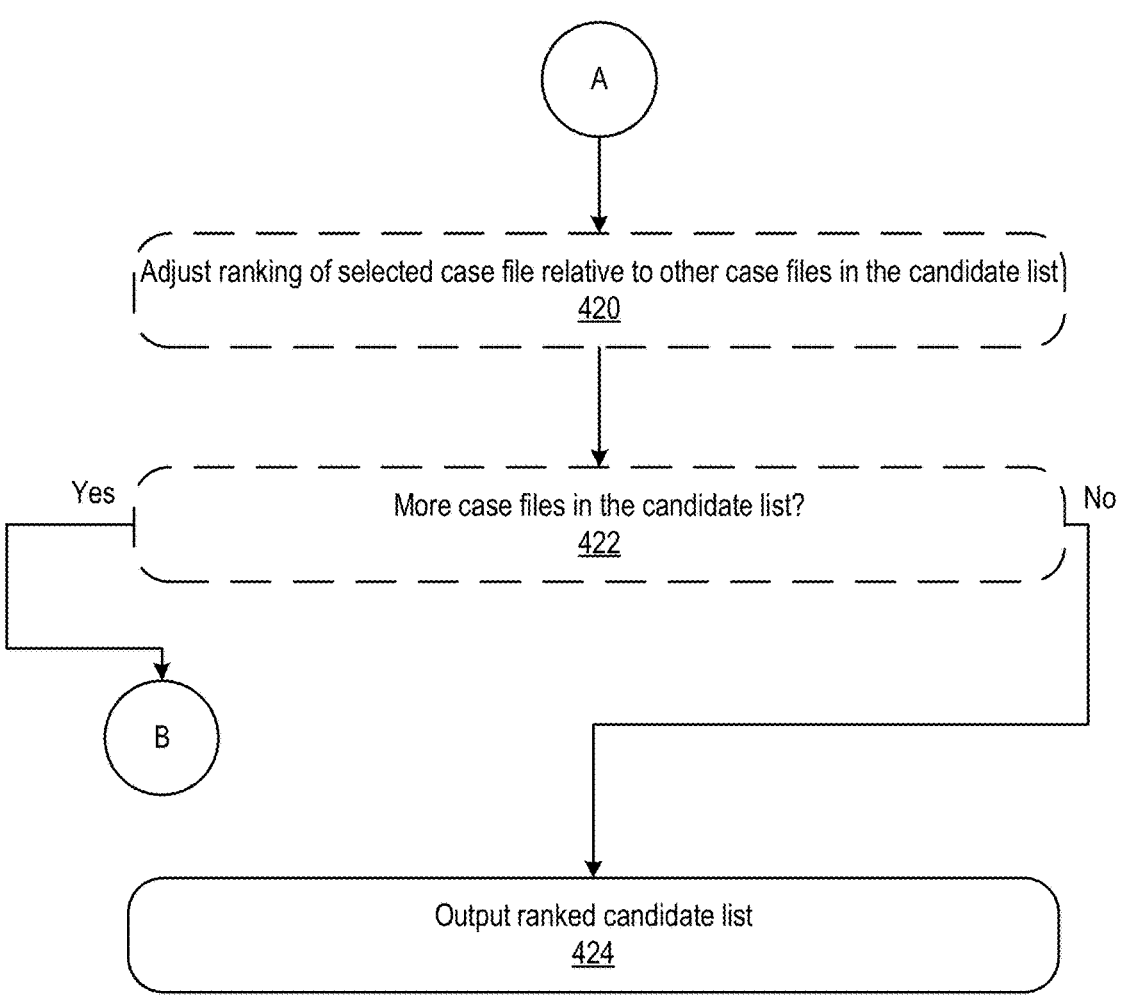

FIGS. 4A-B is a flowchart of a process 400 for ranking case files in a candidate list. The process 400 can be performed for each store in a plurality of stores. The process 400 can be performed each day, such that a new updated candidate list can be generated and used to create daily watch lists for the stores. The process 400 can also be performed at predetermined times, such as every couple days and/or whenever a case file is generated, scored, and/or updated. Moreover, a candidate list can be generated per store, based on case files that are associated with that store. The candidate list can then be used to generate a final watch list for the particular store, as described above and in reference to FIG. 5. The watch list can be a culled or otherwise shortened version of the candidate list, where the watch list includes case files that pose the greatest threats to the store rather than all the case files that are scored for the store.

As described herein, the process 400 can be performed by the computer system 102. One or more blocks of the process 400 can also be performed by another device, computer, computing system, server, and/or network of computers and/or servers. For illustrative purposes, the process 400 is described from the perspective of a computer system.

Referring to the process 400 in both FIGS. 4A-B, the computer system can receive case files and associated threat scores for a store in 402. For example, the computer system can retrieve the case files and their associated threat scores from a data store, such as the case files data store 104 (e.g., refer to FIGS. 1 and 6). In some implementations, the computer system can perform the process 400 after scoring all the case files associated with the store in FIGS. 3A-D (e.g., refer to block 350 in FIG. 3D). Thus, the computer system can use the outputted case file threat scores in block 348 of FIG. 3D to perform the process 400.

The computer system can rank the received case files in a candidate list from highest to lowest threat score in 404. The candidate list can therefore include all case files that have been scored by the computer system in the process 300 (e.g., refer to FIGS. 3A-D). The highest threat score can indicate that a customer associated with the case file poses a greatest threat to the store while the lowest score can indicate that a customer associated with the case file poses a smallest threat to the store. It can be advantageous to rank the case files from highest to lowest threat score in order to determine, by the computer system, which customers pose the greatest threat to the store and therefore should be monitored by in-store employees. As described in reference to FIG. 5, the case files with the highest threat scores can be culled into a watch list. The watch list can then be used by in-store employees to monitor the customers associated with the case files who pose the greatest threats to the store.

Optionally, the computer system can also select a case file at the top of the candidate list (406) and compare the selected case file to other case files in the candidate list (408). Such a comparison can be advantageous to add more or less weight to threat scores of one or more case files. Weighting the case files can be advantageous to determine which customers should be monitored at a current time and which customers may not need to be monitored until a later time, such as a next day or a week later. As an illustrative example, although a first case file can have a higher threat score than a second case file (e.g., because in the aggregate, the first case file is associated with a customer who engaged in continuous thefts over a predetermined timeframe), a customer associated with the second case file may pose a greater threat to the store at the current time (e.g., today, or the day that the candidate list and watch list are generated) because the customer associated with the second case file engaged in theft of items exceeding a predetermined quantity and/or value just one day prior to the current time. Therefore, for the current time, the second case file can be given more weight and ranked higher on the candidate list than the first case file.

Accordingly, based on comparing the selected case file to the other case files in the candidate list, the computer system can adjust a ranking of the selected case file relative to the other case files in 420. Adjusting the ranking of the selected case file can include moving the selected case file up or down in the candidate list. The selected case file can be moved up and down relative to one or more other case files. Adjusting the ranking of the selected case file may not include adjusting or otherwise modifying the actual threat score associated with the selected case file because, as mentioned above, the case files are weighted in order to determine which customer poses a greatest threat to the store at the current time. The threat score can be adjusted or modified using the process 300, whenever new data or evidence is received and associated with the case file.

The computer system can determine whether there are any additional case files in the candidate list that can be compared/weighted relative to each other (422). If yes, then the computer system can select the next case file to be compared with the other case files and repeat blocks 406-420 until there are no more case files in the candidate list to compare/weigh. If no, then the computer system can output the ranked candidate list in 424. Outputting the ranked candidate list can also include storing the ranked candidate list in a data store, such as a lists data store 630, depicted in FIG. 6B. In implementations where the computer system does not perform blocks 406-422, the computer system can output the candidate list (424) after ranking the case files from highest to lowest threat score in 404.

Referring back to block 408, the computer system can compare the selected case file to the other case files in the candidate list using one or more factors and/or conditions. For example, the computer system can determine whether the selected case file includes theft of items within a first predetermined category of items (410). As described in reference to the process 300 in FIGS. 3A-D, the first predetermined category of items can include necessity items or other items that may be more critical for survival, such as fresh produce, toothbrushes, toothpaste, etc. (e.g., refer to block 328 in FIG. 3C). In this example, if the selected case file involves theft of necessity items, then the selected case file can be ranked lower than one or more other case files that do not involve theft of necessity items. After all, the customer associated with the selected case file may pose less of a threat to the store if the customer stole one or more items that they need to survive.

Figure 3A:
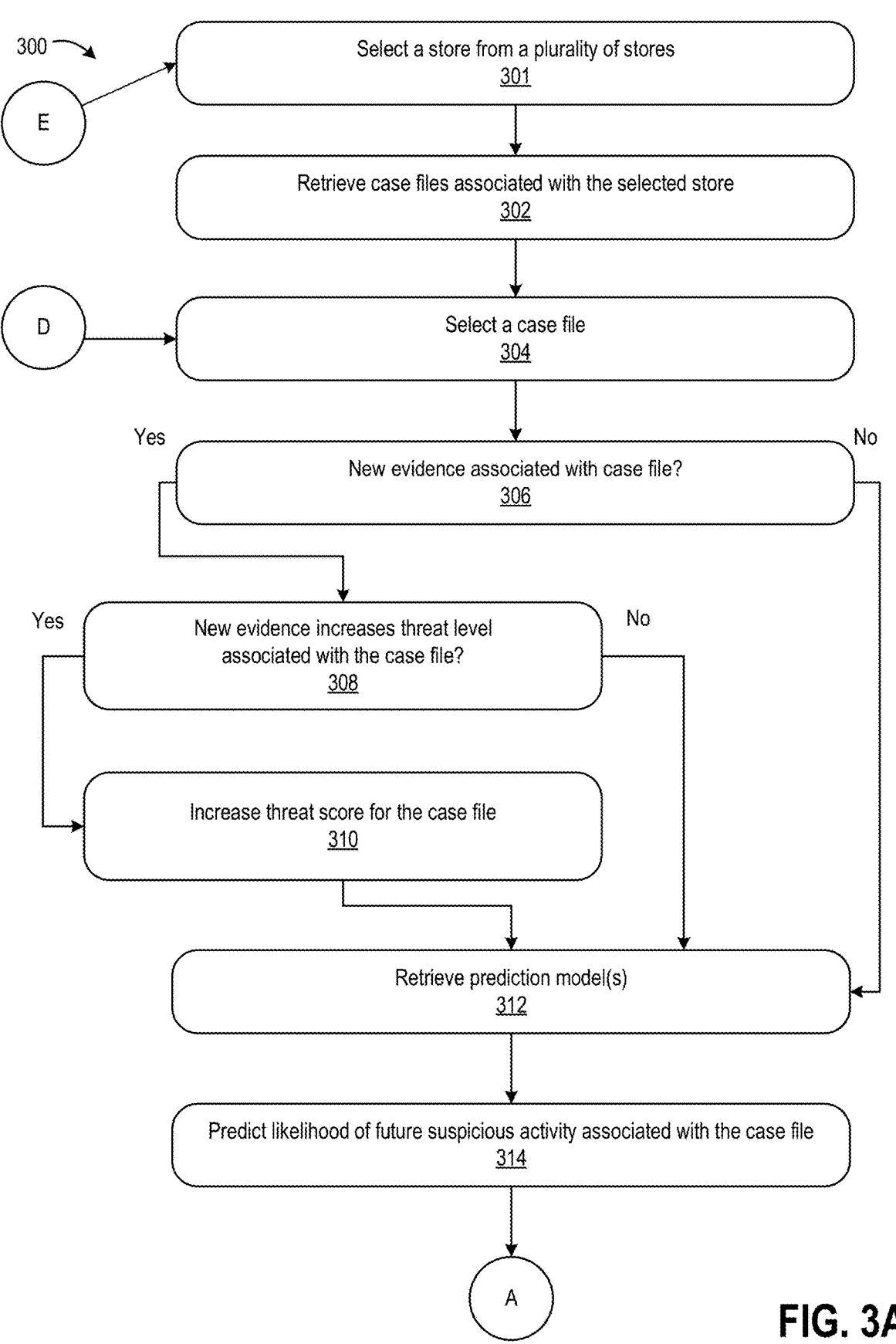
FIGS. 3A-D is a flowchart of a process for scoring a case file.
Figure 3B:
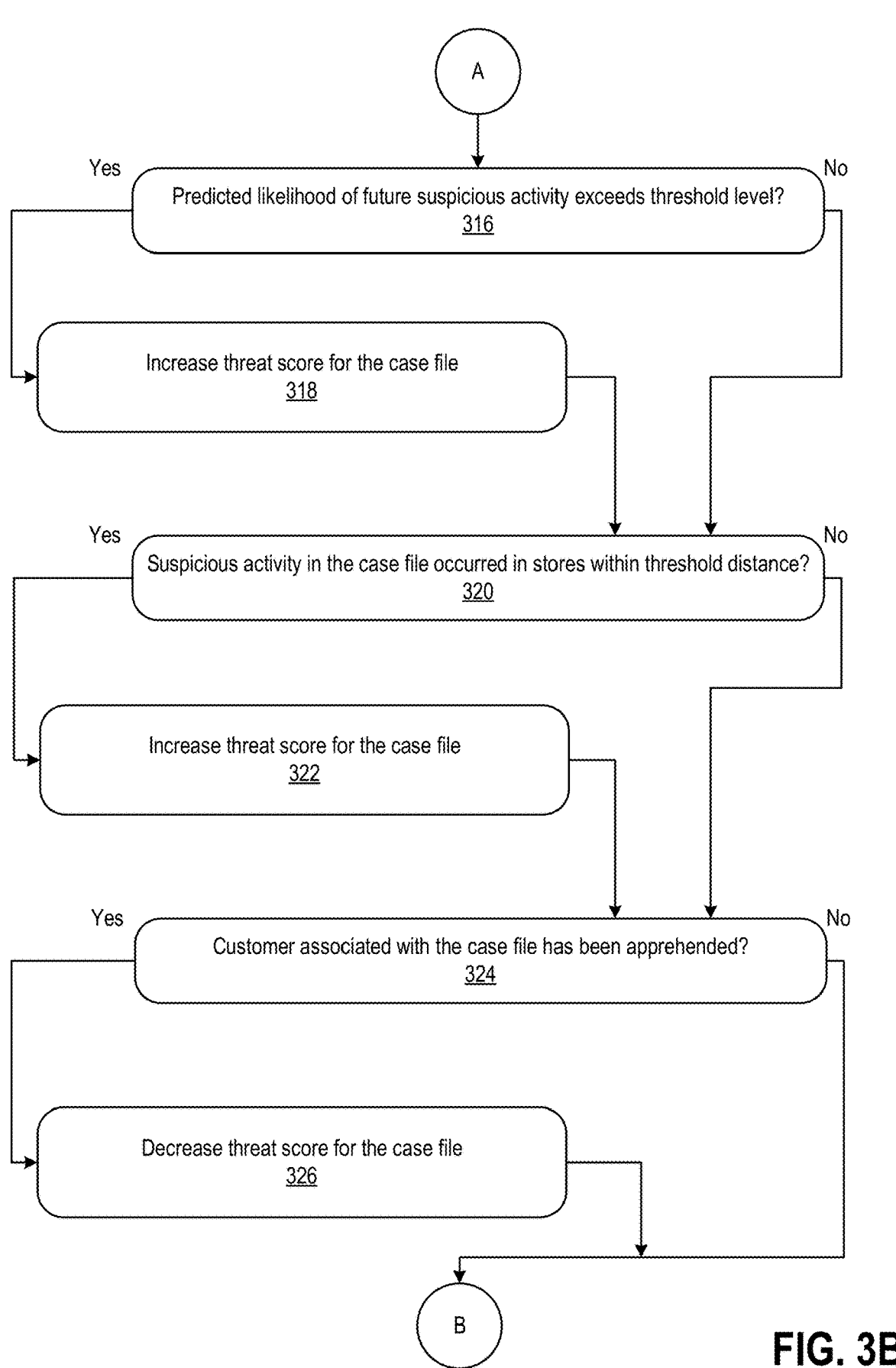
Figure 3C:
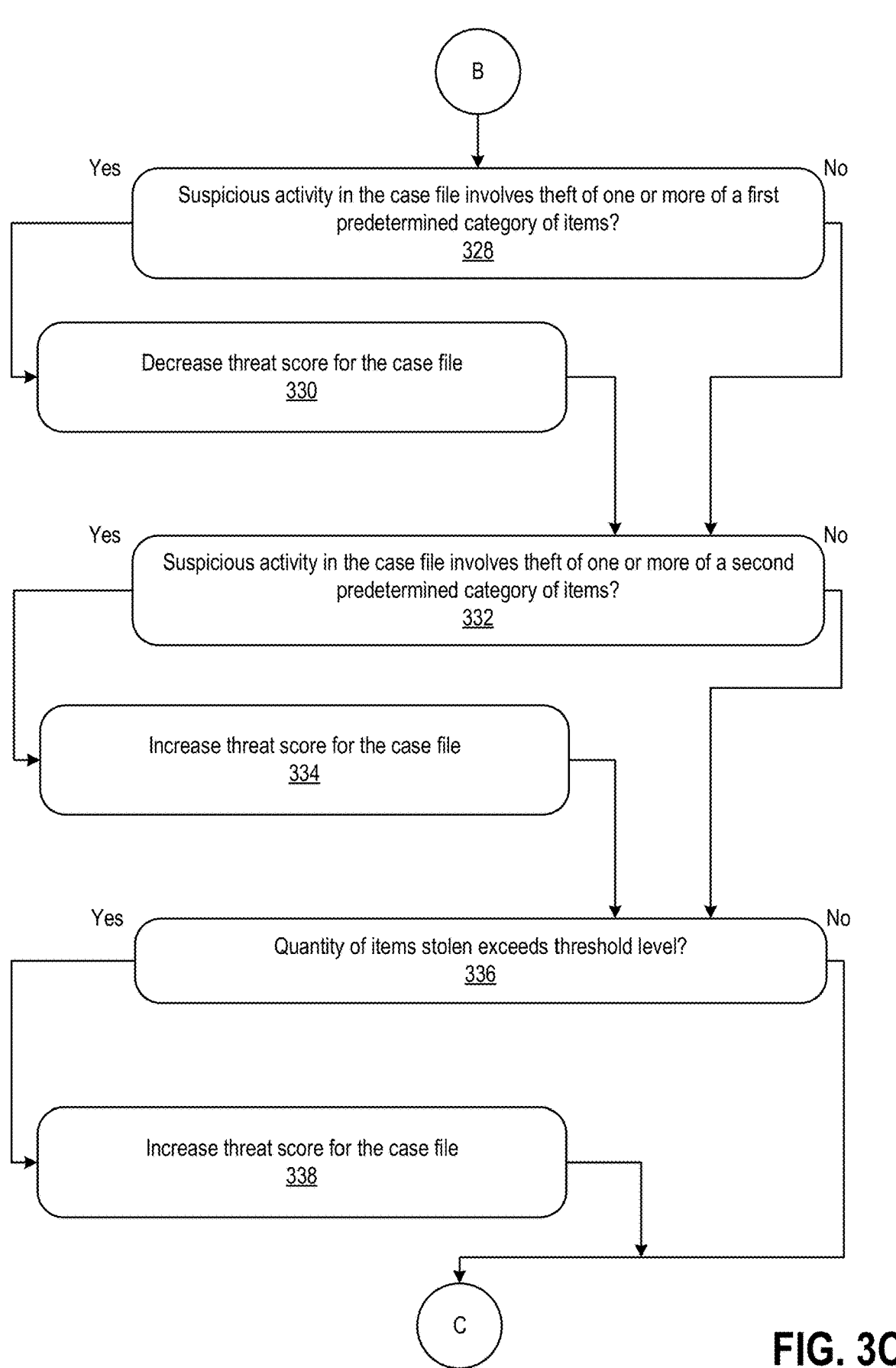
Figure 3D:
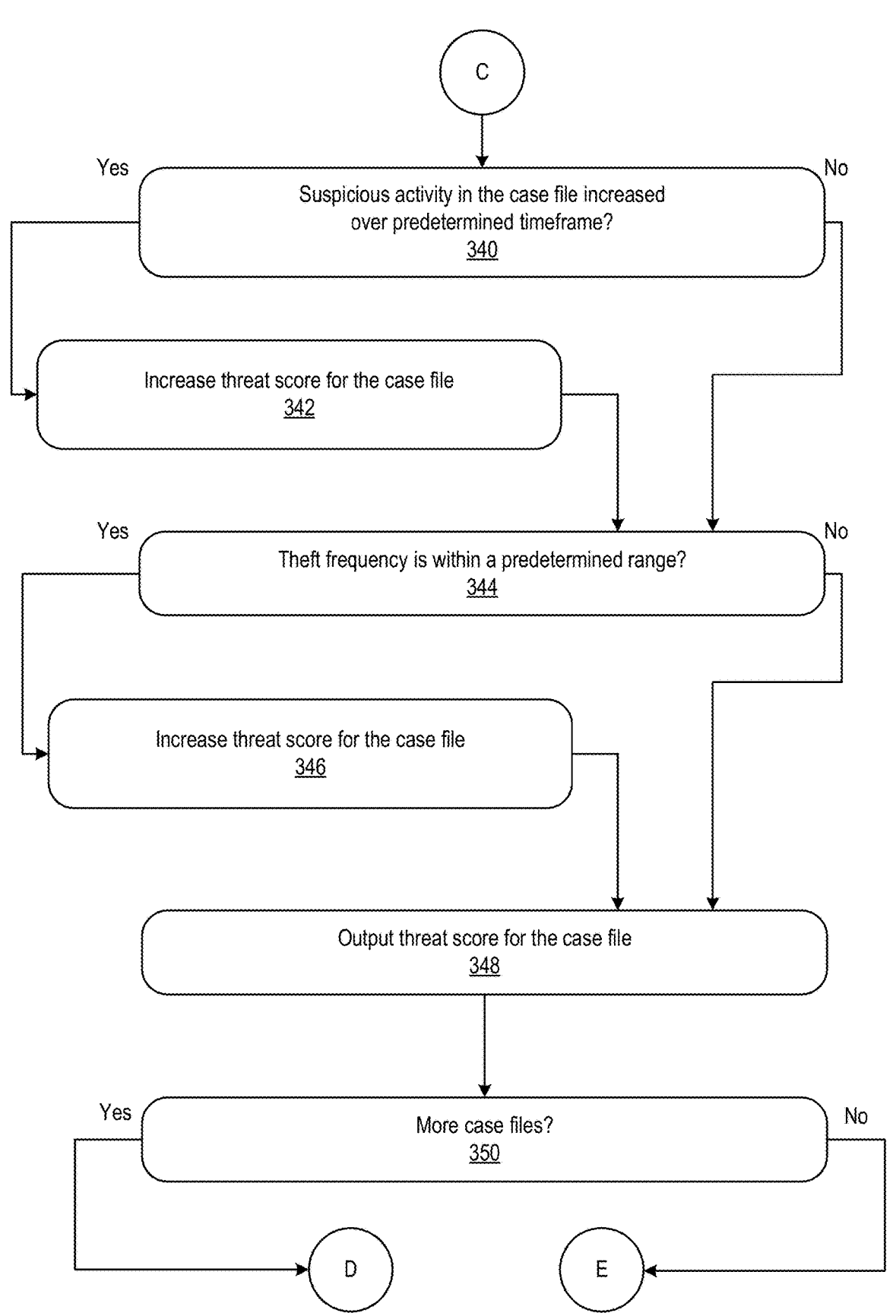

As another example, the first predetermined category of items in 410 can include items that are frequently stolen or otherwise are non-necessity items (e.g., refer to block 332 in FIG. 3C). This category can include items such as TVs and other electronics. In this example, if the selected case file involves theft of one or more non-necessity items, then the selected case file can be ranked higher than one or more other case files that do not involve theft of non-necessity items or case files that involve theft of fewer non-necessity items than the selected case file.

The computer system can also optionally compare the case files based on whether the selected case file involves theft of items in a second predetermined category of items (412). The second predetermined category of items can include items that cost less than a predetermined threshold value. In this example, if the selected case file involves theft of items that each cost less than the predetermined threshold value and/or in the aggregate cost less than the predetermined threshold value, then the computer system can rank the selected case file lower than one or more other case files where theft does not include items in the second predetermined category of items (e.g., the items cost more than the predetermined threshold value).

As another example, the second predetermined category of items can include items that cost more than a predetermined threshold value. In this example, if the selected case file involves theft of items that each cost more than the predetermined threshold value and/or in the aggregate cost more than the predetermined threshold value, then the computer system can rank the selected case file higher than one or more other case files where theft does not include items in the second predetermined category of items (e.g., the items cost less than the predetermined threshold value).

The computer system can also optionally compare the case files based on whether the selected case file involves theft that occurred infrequently over a predetermined timeframe (414). If a customer associated with the selected case file sporadically stole items from the store over the predetermined timeframe, then the customer may pose less of a threat to the store at the current time. Therefore, the case file can be ranked below one or more case files where theft occurred more frequently over the predetermined timeframe. Similarly, if the customer associated with the selected case file stole items frequently over the predetermined timeframe in comparison to one or more other case files, then the selected case file can be ranked above the one or more other case files since the customer most likely poses a bigger threat to the store at the current time.

The computer system can also optionally compare the case files based on whether the selected case file has a theft velocity that decreases over a predetermined timeframe (416). If a customer associated with the selected case file stole large quantities or routinely stole items in a beginning of the predetermined timeframe and then rarely stole or stopped stealing items towards the end of the predetermined timeframe, then the customer likely poses less of a threat to the store at the current time. Therefore, the computer system can rank the selected case file lower than other case files where theft velocity remained constant and/or increased over the predetermined timeframe. Similarly, if the customer associated with the selected case file stole small quantities or rarely stole items in a beginning of the predetermined timeframe and then stole greater quantities or stole more frequently towards the end of the predetermined timeframe, then the customer likely poses a greater threat to the store at the current time. Therefore, the computer system can rank the selected case file above other case files where theft velocity remained constant and/or decreased over the predetermined timeframe.

The computer system can also optionally compare the case files based on whether the selected case file includes past activity that poses a security threat that has a low threat level (418). A customer who engages in physical interaction, such as battery or assault, can pose a greater threat to the store than a customer who never engaged in physical interaction but routinely stole items from the store. Therefore, the case file associated with the customer who engaged in physical interaction can be ranked higher than the case file associated with the customer who never engaged in physical interaction but routinely stole items. After all, it can be preferred for in-store employees to focus on monitoring the customer who engages in physical interaction over the customer who steals more items because the former can cause more harm than the latter.

The computer system can also compare the selected case file to the other case files in the candidate list using one or more other factors and/or conditions.

Figure 5:
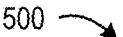
FIG. 5 is a flowchart of a process for generating a watch list for in-store employees.

FIG. 5 is a flowchart of a process 500 for generating a watch list for in-store employees. As described herein, the process 500 can be performed to generate a watch list for each store in a network of stores. Therefore, the process 500 can be performed on a store-by-store basis. The process 500 can be performed whenever a candidate list is generated in the process 400 (e.g., refer to FIGS. 4A-B). The process 500 can also be performed at predetermined times, such as before the start of a new day, every couple days, and/or whenever case files are generated, updated, and/or scored. In some implementations, for example, a new watch list can be generated each day for a store. As described herein, the watch list can be a culled version of the candidate list, wherein the watch list includes the case files from the candidate list having the highest threat scores and/or the case files that are weighted more than other case files in the candidate list. The watch list can then be used by in-store employees to focus on monitoring customers associated with the case files in the watch list. As a result, the in-store employees can more easily digest and remember the case files in the watch list instead of having to digest and remember all the case files that are scored for the particular store.

As described herein, the process 500 can be performed by the computer system 102. One or more blocks of the process 500 can also be performed by another device, computer, computing system, server, and/or network of computers and/or servers. For illustrative purposes, the process 500 is described from the perspective of a computer system.

Referring to the process 500, the computer system can retrieve a candidate list of ranked case files for a particular store in 502. The candidate list can be retrieved from a data store, such as the lists data store 630 in FIG. 6B.

The computer system can also retrieve one or more culling models from a data store in 504. For example, the culling models can be retrieved from models data store 600 depicted in FIG. 6A. The culling models can be trained, using machine learning techniques, to determine which ranked case files should be included in the final watch list. The culling models can be trained to, for example, select a quantity of the top ranked case files to include in the watch list. The quantity of the top ranked case files can be based on severity of activity that poses a security threat in each of the ranked case files. As an illustrative example, if one or more of the top ranked case files include theft of low cost items, then the computer system can determine that a greater quantity of the top ranked case files can be included in the final watch list. After all, the in-store employees may not be burdened having to remember and/or monitor customers who engaged in less threatening activity that poses a security threat. On the other hand, if one or more of the top ranked case files include theft of high cost items and/or serious activity such as physical interaction, then the computer system can determine that a smaller quantity of the top ranked case files should be included in the final watch list. After all, it can be preferred to not overburden the in-store employees with a long watch list of case files. Instead, the in-store employees can focus on fewer but more prominent threats that they should be monitoring and/or addressing.

Thus, the computer system can apply the culling model(s) in 506. Based on application of the culling model(s), the computer system can generate the watch list in 508. Generating the watch list can include random forest ranking techniques (510). For example, using random forest ranking, the computer system can classify case files into one or more groupings. One or more of those groupings can then be included in the generated watch list. The groupings can be made based on severity, type of activity that poses a security threat, theft velocity, quantity of items stolen, cost of items stolen, etc. As an illustrative example, case files can be classified into groups based on theft velocity. A group that includes case files having the highest theft velocities can be included in the watch list. It can be preferred, for example, for the in-store employees to focus on monitoring customers that have higher theft velocities than other customers at a current time. As another illustrative example, case files can be classified into groups based on quantity of items stolen at one time. A group that includes case files with the greatest quantities of items stolen at one time can be included in the watch list. It can be preferred, for example, for the in-store employees to only focus on monitoring customers that steal large amounts of items at once in comparison to other customers who steal smaller amounts of items at once but may steal more often.

The generated watch list can be a shortened version of the candidate list. As described herein, the watch list may only include top threats to the particular store. The computer system can then generate a summary video for each of the case files on the watch list in 512. The summary video can be a compilation of one or more pieces of data associated with the case file. For example, the summary video can include objective identifiers, images or videos of a customer associated with the case file performing some activity that poses a security threat, etc. The summary video can be a short trailer or other display of information that can be used by the in-store employees to quickly and easily learn about each of the customers whose case files are included in the watch list. For example, a summary video can include images of the customer that can be used to objectively identify the customer. The summary video can also include videos depicting the customer's movements and/or gait in the store. The summary video can also include a license plate number of the customer's vehicle or a credit card number of the customer. This type of information may be more digestible for the in-store employees to remember and recall when performing safety and security tasks in the store.

The computer system can then transmit the watch list and summary videos to the in-store employee device in 514. The computer system can transmit the watch list and summary videos at the start of a new day. As a result, a new and/or updated watch list can be used by the in-store employees for that day. The computer system can transmit the watch list and summary videos at one or more other times. For example, the watch list and summary videos can be transmitted at any time during the day, but may not be displayed to the in-store employees at the in-store employee device until the start of the next day. Displaying the watch list and the summary videos immediately upon receipt from the computer system can cause the in-store employees to become confused or otherwise unable to digest and remember customers on a watch list for that day as well as on a watch list for the next day. Therefore, it can be preferred to display the new or updated watch list to the in-store employees at the start of the next day that the watch list is intended for. Moreover, in some implementations, transmitting the watch list and the summary videos can also include storing the watch list and/or the summary videos in a data store, such as the lists data store 630 and/or the case files data store 104 in FIG. 6B.

Figure 6A:
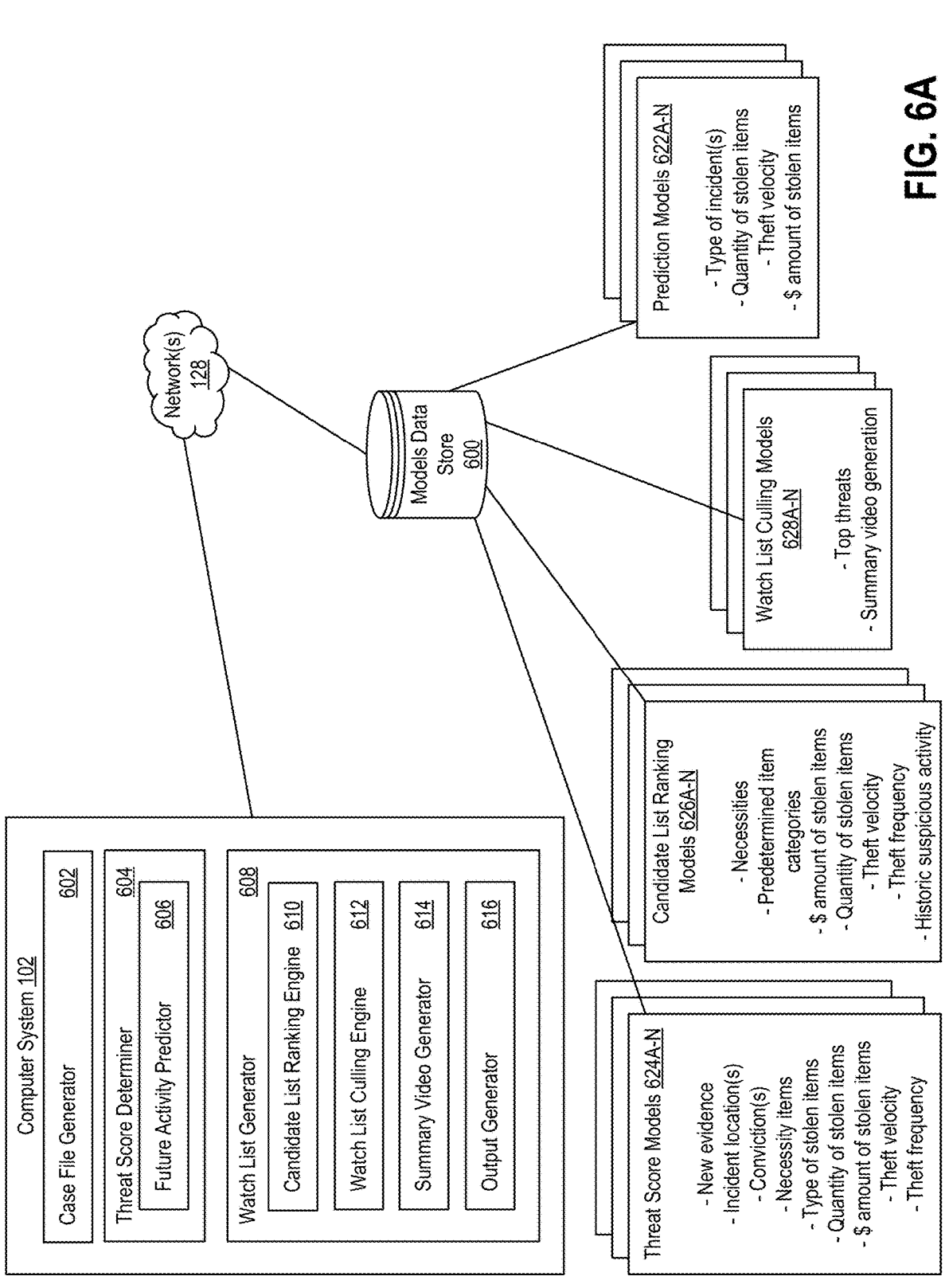
FIGS. 6A-B are system diagrams of components that can be used to perform the disclosed techniques.
Figure 6B:
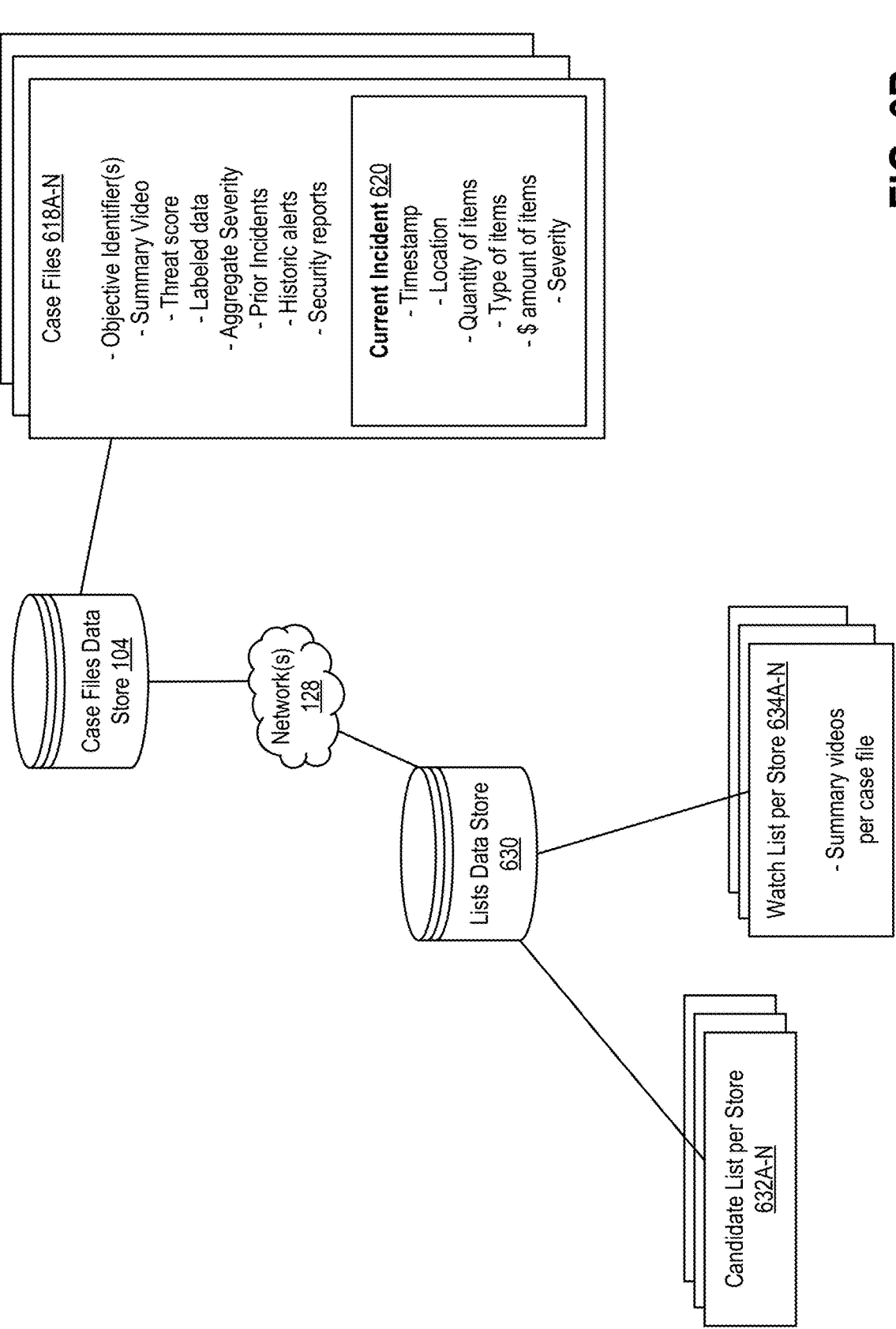

FIGS. 6A-B are system diagrams of components that can be used to perform the disclosed techniques. Referring to both FIGS. 6A-B, the computer system 102, models data store 600, case files data store 104, and lists data store 630 can be in communication (e.g., wired and/or wireless) via the network(s) 128. One or more of the data stores 600, 104, and 630 can be same data stores. The data stores 600, 104, and 630 can include cloud based storage systems or servers, local databases, remote databases, and/or one or more other storage components or repositories for storing data and information. In some implementations, the computer system 102 can be a central server or system (e.g., computer, computing system, computer server, etc.) configured to score case files and generate watch lists for every store in a network of stores. In some implementations, each store can have its own computer system 102. In yet some implementations, the computer system 102 can comprise a plurality of devices and/or computing systems. One or more of the plurality of devices and/or computing systems can be edge computing devices that perform processing with less computational resources and computing power in order to reduce or otherwise avoid clogging network bandwidth. As a result, scoring case files and/or generating watch lists can be performed by the computer system 102 more efficiently and quickly.

The computer system 102 can include one or more components to perform the techniques described herein, such as a case file generator 602, a threat score determiner 604, and a watch list generator 608.

The case file generator 602 can be configured to generate case files and associate those case files with both customers and stores. The case file generator 602 can perform one or more of the operations described in reference to FIG. 2. For example, the case file generator 602 can compile unstructured data as well as system-based inferences that are received from one or more devices and/or systems in a store (e.g., refer to step D in FIG. 2). The generator 602 can also add structure to the unstructured data and system-based inferences using one or more structuring models. The generator 602 can use labels and/or action classifiers to identify structured data that may indicate different types of activity that poses a security threat, such as barcode swapping, mismatched labels, and shoplifting. Moreover, the case file generator 602 can make associations between/amongst the labeled and classified data (e.g., refer to step E in FIG. 2). As described herein, the generated case files can be robust and accurate collections of structured and associated data. The case files can include objective identifiers that can be used to identify particular customers. In some implementations, a case file can be generated per security event that is identified. In some implementations, a case file can be generated per customer, and each security event that is identified can be added to that customer's case file. As described herein, the case files can also be associated with particular stores where the activity that poses a security threat occurred.

Still referring to the case file generator 602, the generator 602 can also determine a severity of the security event(s) in the case file. Assessing severity can be based on one or more factors, such as a single incident, aggregate of incidents, acceleration of incidents, deceleration of incidents, dollar amount involved in an incident or incidents, quantity of items involved in an incident or incidents, and/or type of items in an incident or incidents.

Once the case file generator 602 generates case files, the case files can be stored in the case files data store 104. The case files data store 104 can store a plurality of case files 618A-N. Each of the case files 618A-N can include information such as objective identifiers, a summary video, threat score, labeled data, aggregate severity, prior incidents, historic alerts, security reports, and a current incident 620. The current incident 620 can further include information such as a timestamp, location of the incident, quantity of items involved in the incident, type of items involved in the incident, dollar amount of the items involved in the incident, and/or severity of the incident. In some implementations, the current incident 620 can be new evidence that is received and associated with the particular case file. As described herein, this new evidence can be used to update one or more of a threat score of the particular case file and a ranking of the case file relative to other case files in a watch list. Information stored in the case files data store 104 can be used by one or more components of the computer system 102 to assess a threat score for each case file and/or to rank the case files in a watch list.

Still referring to the computer system 102, the threat score determiner 604 can be configured to determine a threat score for each of the case files for a particular store. Using the techniques described herein, the determiner 604 can retrieve the case files 618A-N associated with a particular store from the case files data store 104. The determiner 604 can assess information such as aggregate severity, prior incidents, historic alerts, security reports, and/or the current incident 620 in order to assign the associated case file a threat score (e.g., refer to the process 300 in FIGS. 3A-D).

The threat score determiner 604 can also assign scores to the case files using one or more threat score models 624A-N. The threat score models 624A-N can be retrieved from the models data store 600 and can be trained using machine learning techniques, as described throughout this disclosure. The threat score models 624A-N can be trained to determine threat scores based on a variety of factors, including but not limited to new evidence associated with the case file, location(s) of activity that poses a security threat reported in the case file, conviction(s) or apprehension of a customer associated with the case file, theft of necessity items, type of items stolen, quantity of items stolen, dollar amount or cost of items stolen, theft velocity, and theft frequency.

The threat score determiner 604 can also include a future activity predictor 606. The predictor 606 can use one or more prediction models 622A-N in order to determine a likelihood that the customer associated with the case file will engage in future activity that poses a security threat. Determinations made by the future activity predictor 606 can also be used by the threat score determiner 604 in order to assign a threat score to the case file. The future activity predictor 606 can retrieve one or more of the prediction models 622A-N from the models data store 600. The prediction models 622A-N can be trained using machine learning techniques, as described throughout this disclosure. The prediction models 622A-N can be trained to predict likelihood of future activity that poses a security threat based on a variety of factors, including but not limited to type of incident(s) reported in the case file, quantity of stolen items, theft velocity, and/or dollar amount or cost of stolen items.

The watch list generator 608 can be configured to generate a watch list for each store. The watch list generator 608 can receive the case files and their associated threat scores from the threat score determiner 604. The watch list generator 608 can also retrieve the case files and their associated threat scores for a particular store from the case files data store 104. Using the case files and their associated threat scores, the watch list generator 608 can generate a candidate list as well as the watch list for the particular store.

The watch list generator 608 can, for example, include a candidate list ranking engine 610, a watch list culling engine 612, a summary video generator 614, and an output generator 616. The candidate list ranking engine 610 can be configured to rank the case files associated with the particular store from highest threat score to lowest threat score (e.g., refer to the process 400 in FIGS. 4A-B). The engine 610 can return a candidate list that includes all of the case files associated with the particular store. The returned candidate list can be stored in the lists data store 630 as candidate list per store 632A-N.

As described herein, the engine 610 can also adjust rankings of one or more of the case files in the candidate list based on weight factors (e.g., refer to blocks 408-418 in FIG. 4A). The engine 610 can rank and weigh the case files using one or more candidate list ranking models 626A-N, which can be retrieved from the models data store 600. The candidate list ranking models 626A-N can be trained using machine learning techniques, as described herein. The candidate list ranking models 626A-N can be configured to rank the case files for the particular store based on a variety of factors, including but not limited to necessities, predetermined categories of items, dollar amount or cost of stolen items, quantity of stolen items, theft velocity, theft frequency, and/or historic activity that poses a security threat.

The watch list culling engine 612 can be configured to generate the final watch list that can be used by the in-store employees to monitor guests who pose specific security threats. Using the techniques described herein, the watch list culling engine 612 can receive the ranked candidate list from the candidate list ranking engine 610. The engine 612 can also retrieve the ranked candidate list from the lists data store 630 for the particular store. Using one or more watch list culling models 628A-N that are retrieved from the models data store 600, the watch list culling engine 612 can determine which of the ranked case files in the candidate list should be included in the final watch list. As described throughout, the final watch list can be a shortened and easily digestible version of the candidate list having all the case files. As a result, the final watch list can be used by the in-store employees to focus on monitoring and responding to the biggest threats that are posed to the particular store.

The one or more watch list culling models 628A-N can be trained using machine learning techniques, as described herein. The one or more watch list culling models 628A-N can be trained to determine which of the case files from the ranked candidate list to include in the watch list based on a variety of factors, including but not limited to which case files pose the greatest threats or are considered top threats.

The watch list generated by the watch list culling engine 612 can be stored in the lists data store 630 as watch list per store 634A-N.

The summary video generator 614 can be configured to generate a short summary video for each of the case files included in the watch list. The summary video generator 614 can receive the watch list from the watch list culling engine 612. The summary video generator 614 can also retrieve the watch list from the lists data store 630. Using one or more watch list culling models 628A-N retrieved from the models data store 600, the summary video generator 614 can create the summary videos for each of the case files in the watch list. For example, as described herein, one or more of the watch list culling models 628A-N can be trained, using machine learning techniques, to compile information from a case file into an easily digestible report that can be used by the in-store employees to quickly and easily learn about the case file in the watch list. Summary videos generated by the generator 614 can then be stored in association with the watch list per store 634A-N in the lists data store 630.

Finally, the output generator 616 can be configured to generate a graphical user interface (GUI) of the watch list and the summary videos for display at the in-store employee device(s) described herein. The output generator 616 can receive the watch list from the watch list culling engine 612 and the summary videos from the summary video generator 614. The output generator 616 can also retrieve the watch list per store 634A-N from the lists data store 630. Once the output is generated, the output generator 616 can also be configured to transmit the output (e.g., the watch list and associated summary videos) to the in-store employee device(s). In some implementations, the output generator 616 can transmit the output at predetermined times, such as at the start of a new day that is associated with the watch list.

Figure 7:
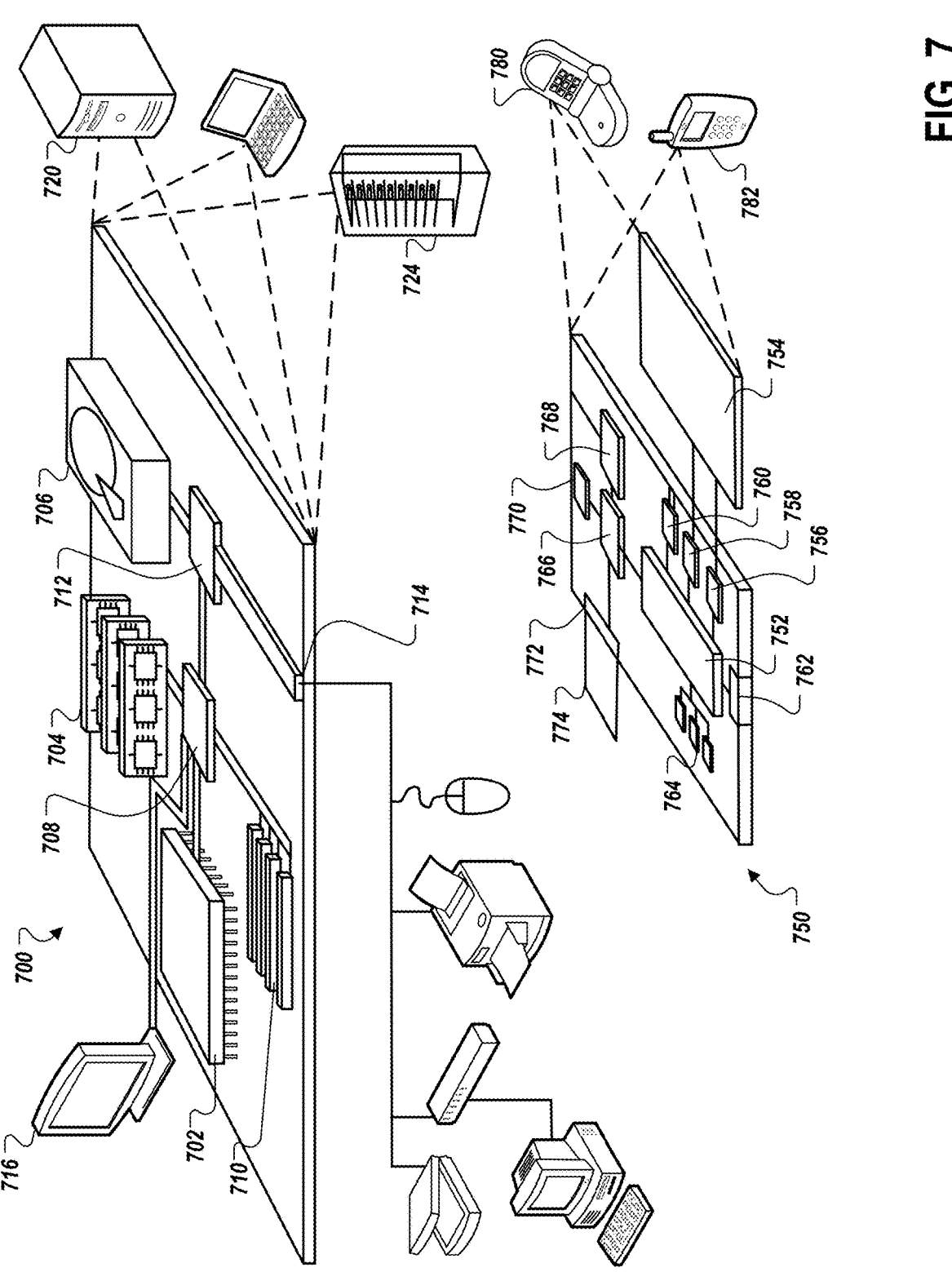
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 8 is a flowchart of a process 800 for dividing a watch list into multiple groups for in-store employees. The process 800 can be performed to provide the in-store employees with all case files that arise to some level of suspicion without overburdening any one of the in-store employees to digest large quantities of case files on the watch list. The process 800 can be performed by the computer system 102. The process 800 can also be performed by any other computer, device, system, cloud-based service, and/or network of computers or devices. For illustrative purposes, the process 900 is described from a perspective of a computer system.

Referring to the process 800, the computer system retrieves a candidate list of ranked case files for a store in 802, as described throughout this disclosure.

The computer system determines whether a quantity of case files in the candidate list exceeds a threshold quantity (804). The threshold quantity can vary depending on one or more factors. For example, the threshold quantity can be different for each store and/or region. In some implementations, the threshold quantity can be same or similar across multiple stores in a region and/or regions. Where a particular store receives low levels of traffic because shoppers have the ability to travel to other stores (e.g., there is a significant quantity of stores in a particular region), the threshold quantity can be higher for the particular store. After all, because there is not much traffic in the particular store, in-store employees, like safety and security personnel, can have the ability and time to review more case files in a watch list than employees in a store where there is significantly more traffic. On the other hand, if the particular store is routinely trafficked and/or busy, it may be more challenging for in-store employees to carefully and effectively review all the case files in the watch list when they are on the clock. Example threshold quantities can include but are not limited to 11, 15, 20, 25, 50, 100, etc. case files.

In some implementations, the threshold quantity can be a quantity of case files that typically may be included in a watch list. For example, a culled watch list can contain 10 case files that can be reviewed and studied by an in-store employee. The threshold quantity can be 10 or 11 case files. As a result, if the candidate list includes more than 10 case files, then the computer system proceeds to block 806.

If the quantity of case files in the candidate list exceeds the threshold quantity, the computer system can divide the case files into groups in a watch list (806). This can be based on at least one of quantity of case files and quantity of in-store employees (e.g., safety and security personnel). As an example, the candidate list can include 100 case files and the threshold quantity can be 10 (which is representative of 10 case files per watch list). The computer system can divvy up the case files into groups of 10, such that there are 10 groups of 10 case files each in the watch list. In some implementations, the computer system can allot ranked case files 1-10 in a first group, the next ranked case files 11-20 in a second group, and so on until all 100 case files are grouped. In some implementations, the computer system can randomly allot case files to different groups in the watch list. The computer system can also divide the case files into groups that do not contain equal numbers of case files. For example, one group can have 5 case files while another group has 10 case files. In yet some implementations, the computer system can divide the case files into groups based on one or more factors, such as type of suspicious activity identified for each of the case files, suspicion level or threat level assigned to each case file, velocity and/or frequency of suspicious activity associated with each case file, etc.

The computer system then assigns each of the groups of case files in the watch list to in-store employees in 808. Sometimes, one or more employees may receive the same group of groups of case files. Sometimes, each employee may be assigned a different group of case files. In yet some implementations, one or more groups can contain overlap in some or all of the case files. Overlap in case files and/or group assignments can be beneficial to ensure that case files are being accurately analyzed by the in-store employees.

To assign the groups of case files to the in-store employees, the computer system can receive schedules indicating which and how many employees are working shifts. The groups can be assigned to the currently working employees and/or the employees who will be starting their shifts. Thus, when an employee starts their shift, they can receive a group of case files from the watch list that, as part of their job, they should analyze. The employee can therefore focus on monitoring the store for shoppers that are objectively identified in the case files making up the group that the employee was assigned.

In 810, the computer system generates summary videos for each case file. Refer to FIG. 5 for further discussion.

Referring back to 804, if the quantity of case files in the candidate list does not exceed the threshold quantity, the computer system can proceed to block 810, in which the computer system generates summary videos for each case file. After all, the candidate list may include a digestible quantity of case files (e.g., 10 case files in total) that can be used by the in-store employees to objectively monitor shoppers at the store. Since the candidate list includes a digestible quantity of case files, the case files may not need to be divided into groups in a watch list. Instead, the candidate list of case files can be the watch list that is transmitted and reviewed by one or more in-store employees.

The computer system transmits at least one of the watch list, the summary videos, and/or the assignments for each group of case files in the watch list to in-store employee devices (812). In some implementations, each in-store employee can receive the full/complete watch list containing all of the case files that were ranked into the candidate list. Each in-store employee can also receive the particular group of case files in the watch list that they were assigned. Thus, the in-store employee can focus on digesting their group of case files, however they may also review and analyze any of the other case files in the full/complete watch list. In some implementations, each in-store employee may only receive the group of case files that they were assigned, instead of the full/complete watch list.

In some implementations, the computer system can transmit the full/complete watch list along with the assignments to a master device, such as a computing device of an in-store manager. The in-store manager can then provide the groups of case files to each of the in-store employees.

Moreover, as described above, the computer system can also transmit the summary videos with the case files. The in-store employees can review and analyze the case files using the summary videos, as described throughout this disclosure.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for generating data about users who pose a security threat to a retail environment, the system comprising:

one or more devices positioned throughout a retail environment and configured to generate unstructured data and system-based inferences about activity of users in the retail environment;

a data store configured to store data files associated with the retail environment, wherein each data file comprises the unstructured data and the system-based inferences about a user in the retail environment whose activity poses a security threat; and a computing system in communication with at least the data store, wherein the computing system is configured to perform a process comprising:

obtaining the data files from the data store;

for each data file, predicting, based on applying a machine learning model to the unstructured data and the system-based inferences about the user, future activity of the user, wherein the machine learning model was trained to predict the future activity of the user based on at least activity type and activity velocity data recorded in the unstructured data and the system-based inferences about the user;

identifying at least one data file of the data files that has respective predicted future activity satisfying one or more threat criteria;

for the at least one data file, generating a visual representation of the respective activity data; and returning, for presentation in a graphical user interface (GUI) display, the visual representation for the at least one data file.

2. The system of claim 1, wherein the one or more devices include RFID readers, location-based signaling devices, mobile devices, and point of sale (POS) terminal checkout lanes.

3. The system of claim 1, wherein the machine learning model was further trained to predict the future activity of the user based on a quantity of stolen items recorded in the activity data of the data file.

4. The system of claim 1, wherein the machine learning model was further trained to predict the future activity of the user based on a cost of stolen items recorded in the activity data of the data file.

5. The system of claim 1, wherein the process further comprises: adding the at least one data file to a watch list for the retail environment.

6. The system of claim 5, wherein the process further comprises: returning, for presentation in the GUI display, the watch list.

7. The system of claim 1, wherein the process further comprises: for each data file, determining a threat score of the user based on the predicted future activity of the use, wherein determining the threat score comprises assigning a threat score above a threshold score value based on determining that the predicted future activity exceeds a threshold suspicion level.

8. The system of claim 7, wherein identifying the at least one data file of the data files that has respective predicted future activity satisfying one or more threat criteria comprises identifying the at least one data file having a highest respective threat score.

9. The system of claim 7, wherein the process further comprises:

identifying a subset of the data files having respective threshold scores that satisfy one or more threat criteria; and generating a watch list that includes the subset of the data files.

10. The system of claim 9, wherein identifying the subset of the data files is based on applying a machine learning model to the data files, the machine learning model having been trained to identify the subset of the data files comprising activity and predicted future activity that poses a greatest current threat to the retail environment.

11. A system for generating a watch list of users for a retail environment, the system comprising:

one or more devices positioned throughout a retail environment and configured to generate unstructured data and system-based inferences about activity of users in the retail environment;

a data store configured to store data files associated with the retail environment, wherein each data file comprises the unstructured data and the system-based inferences about a user in the retail environment whose activity poses a security threat; and a computing system in communication with at least the data store, wherein the computing system is configured to perform a process comprising:

obtaining the data files from the data store;

for each data file, predicting, based on applying a machine learning model to the unstructured data and the system-based inferences about the user, future activity of the user, wherein the machine learning model was trained to predict the future activity of the user based on at least activity type and activity velocity data recorded in the unstructured data and the system-based inferences about the user;

identifying at least one data file of the data files that has respective predicted future activity satisfying one or more threat criteria;

adding the at least one data file to a watch list for the retail environment; and returning the watch list for the retail environment.

12. The system of claim 11, wherein the process further comprises:

for the at least one data file, generating a visual representation of the respective activity data; and returning, for presentation in a GUI display, the visual representation for the at least one data file.

13. The system of claim 11, wherein the process further comprises: for each data file, determining a threat score of the user based on the predicted future activity of the user, wherein determining the threat score comprises assigning a threat score above a threshold score value based on determining that the predicted future activity exceeds a threshold suspicion level.

14. The system of claim 13, the method further comprising:

ranking the data files into a candidate list from highest threat score to lowest threat score; and generating a watch list that includes a subset of the data files in the candidate list, wherein the subset of the data files is identified based on the respective threat scores.

15. The system of claim 14, wherein generating the watch list comprises applying a culling machine learning model to the candidate list, the culling machine learning model having been trained to identify the subset of the data files comprising activity and predicted future activity that poses a greatest current threat to the retail environment, wherein the greatest current threat to the retail environment corresponds to a threshold time period.

16. A method for generating data about users who pose a security threat to a retail environment, the method comprising:

obtaining data files associated with a retail environment, wherein each data file comprises activity data associated with a user who poses a security threat at the retail environment;

for each data file, predicting, based on applying a machine learning model to the activity data, future activity of the user, wherein the machine learning model was trained to predict the future activity of the user based on at least activity type and activity velocity data recorded in the data file;

identifying at least one data file of the data files that has respective predicted future activity satisfying one or more threat criteria;

for the at least one data file, generating a visual representation of the respective activity data; and returning, for presentation in a graphical user interface (GUI) display, the visual representation for the at least one data file.

17. The method of claim 16, the method further comprising:

adding the at least one data file to a watch list for the retail environment; and returning, for presentation in the GUI display, the watch list.

18. The method of claim 16, the method further comprising:

for each data file, determining a threat score of the user based on the predicted future activity of the user;

ranking the data files into a candidate list from highest threat score to lowest threat score; and generating a watch list that includes a subset of the data files in the candidate list, wherein the subset of the data files is identified based on the respective threat scores.

19. The method of claim 16, wherein the visual representation of the at least one data file comprises a summary video of the at least one data file.

20. The method of claim 16, wherein the visual representation of the at least one data file comprises a device-based inference that objectively identifies the user associated with the at least one data file.

* * * * *